United States Patent
Kitai et al.

[11] Patent Number: 5,725,801
[45] Date of Patent: Mar. 10, 1998

[54] DOPED AMORPHOUS AND CRYSTALLINE GALLIUM OXIDES, ALKALINE EARTH GALLATES AND DOPED ZINC GERMANATE PHOSPHORS AS ELECTROLUMINESCENT MATERIALS

[75] Inventors: Adrian H. Kitai, 1265 Wilson St. East, Hamilton, Ontario, Canada, L8S 4K6; Tian Xiao, Hamilton; Guo Liu, Edmonton, both of Canada

[73] Assignee: Adrian H. Kitai, Hamilton, Canada

[21] Appl. No.: 674,842

[22] Filed: Jul. 3, 1996

Related U.S. Application Data

[60] Provisional application No. 60/000,781, Jul. 5, 1996.

[30] Foreign Application Priority Data

Jan. 5, 1996 [GB] United Kingdom ............... 9600225

[51] Int. Cl.$^6$ ............... C04B 35/00; C09K 11/80; C09K 11/55
[52] U.S. Cl. ............... 252/301.4 R; 501/123; 501/126
[58] Field of Search ............... 252/301.4 R, 301.4 F; 313/503; 501/123, 126

[56] References Cited

U.S. PATENT DOCUMENTS 2,457,054 12/1948 Leverenz et al. ............... 252/301.6 F

FOREIGN PATENT DOCUMENTS

| 490621 | 6/1992 | European Pat. Off. | ......... 252/301.4 F |
| 48-43034 | 12/1973 | Japan . | |
| 1579925 | 7/1990 | U.S.S.R. | ............... 252/301.6 F |
| 1579926 | 7/1990 | U.S.S.R. | ............... 252/301.6 F |

OTHER PUBLICATIONS

Herbert et al, "Luminescence of $Dy^{3+}$-Activated $\beta-Ga_2O_3$", Jour. Electrochem. Soc. vol. 115(1), pp. 104–105, Jan. 1968.

(List continued on next page.)

*Primary Examiner*—Melissa Bonner
*Attorney, Agent, or Firm*—Lynn C. Schumacher; Dowell & Dowell

[57] ABSTRACT

New oxide phosphors based on doped gallium oxides, alkaline earth gallates and germanates for electroluminescent display materials. Bright orange red electroluminescence has been obtained in amorphous and crystalline oxides $Ga_2O_3$:Eu for the first time. $SrGa_2O_4$ and $SrGa_4O_9$ doped with 1–8 mole % of Eu and Tb, $CaGa_2O_4$, $Ca_3Ga_2O_6$ and $CaGa_4O_7$ doped with 1–4 mole % of Eu, Tb, Pr and Dy, $BaGa_2O_4$ doped with 1–2 mole % of Eu and Tb, have been prepared using RF magnetron sputtering onto ceramic dielectric substrates and annealed at 600° C.–950° C. in air or Ar for 1–2 hours. Bright electroluminescent (EL) emission was obtained with wavelengths covering the visible spectrum from 400 to 700 nm, and infrared emission above 700 nm with spectral peaks characteristic of rare earth transitions. The films of $CaGa_2O_4$ with 1 mole % Eu achieved 22 fL (75 cd/m$^2$) at 60 Hz and had a maximum efficiency of 0.2 lm/w for red emission. An amorphous thin film of $Ca_3Ga_2O_6$ with 2 mole % Eu achieved 34 fL in red EL at 60 Hz when annealed at 600° C. $SrGa_2O_4$ with 1 mole % Eu and 4 mole % Tb yielded "white" phosphor having red, green and blue emission (13 fL at 60 Hz), and $SrGa_2O_4$ with 8 mole % Tb resulted in a blue and green phosphor measuring 30 fL at 60 Hz. $Zn_2Si_{0.5}Ge_{0.5}O_4$ containing Mn was sputtered using magnetron RF sputtering onto ceramic dielectric substrates and annealed at 700° C. for 1 hour in air or argon. Bright green (540 nm) emission was obtained in electroluminescence: 110 fL (377 cd/m$^2$) at 60 Hz with a maximum efficiency of 0.9 l/w. Moderately bright red emission (640 nm) was also obtained.

11 Claims, 27 Drawing Sheets

OTHER PUBLICATIONS

Luminescent Materials by Humboldt W. Leverenz, Chemico-Physics Section, RCA Manufacturing Company, Camden, New Jersey and Frederick Seitz, Randal–Morgan Laboratory of Physics, University of Pennsylvania, Philadelphia, Pennsylvania, Journal of Applied Physics, vol. 10, Jul 1939, pp. 479–493.

XP 000607881, Chem. Mater. 1995, 7, 1547–1551; Luminescence of $Eu^{2+}$ in Barium and Strontium Aluminate and Gallate; S.H.M. Poort, W.P. Blokpoel, and G. Blasse, Debye Institute, Utrecht University, P. O. Box 80 000 3508 TA Utrecht, The Netherlands, Received Mar. 14, 1995. Revised Manuscript Received Jun. 2, 1995; 1995 American Chemical Soceity.

P–38 Electroluminescence of $Zn_2Sio_4$:Mn Thin–Film Phosphor, A.H. Kitai, X. Ouyang, McMaster University, Hamilton, Ontario, Canada, SID 94 Digest, pp. 572–575, no date.

XP 000607440; Journal of Luminescence 11 (1976) 443–436; North–Holland Publishing Company, On the Luminescence of $\beta$–$Ga_2O_3$:$Dy^{3+}$; J.L. Sommerdijk, A.C. Van Amstel and F.M.J.H. Hoex–Strik, Philips Research Laboratories, Eindhoven, The Netherlands, Received 28 Nov. 1975.

10.2: High–Luminance Green–Emitting EL Devices with a $Zn_2Sio_4$:Mn Thin–Film Emitting Layer; T. Minami, T. Miyata, S. Takata, I. Fukuda, Kanazawa Institute of Technology, Ishikawa Japan; SID 92, pp. 162–165, no date.

Compound Formation and $Mn^{2+}$–Activated Luminescence in the Binary Systems $R_2O$–and $RO$–$Ga_2)_3*$; C.W.W. Hoffman, United Sierra Divisin, Cypress Mines Corporation, 101 Oakland Avenue, Trenton, New Jersey and Jesse J. Brown, Department of Metals & Ceramic Engineering Virginia Polytechnic Institute, Blacksburg, Virginia 24061; Sylvania Electric Products Inc. Chemical and Metallurgical Division, Towanda, Pennsylvania 18848; J. inorg. nucl.Chem 1968, vol. 30 pp.63–79 no month.

J. Electrochem, Soc.: Solid State Science, Jan. 1968, Luminescence of $Dy^{3+}$–activated $\beta$–$Ga_2O_{3+}$, Willaim C. Herbert, Henry B. Minnier, and Jesse J. Brown, Chemical and Metallurgical Division, Syvania Electric Products, Inc., Towanda, Pennsylvania, pp. 104–105.

Journal of Luminescence 40 & 41 (1988) 103–104, North Holland, Amsterdam; Luminescence from $\beta$–$Ga_2O_3$:$Cr^{3+}$: C.G. Walsh, J.F. Doegan, T.J. Glynn, G.P. Morgan and G.F. Imbusch; Department of Physics, University College, Galway, Ieland no month.

32.4/Minami 32.4: New High–Luminance TFEL Devices Using $ZnGa_2O_4$ Phosphor Emitting Layers, T. Minami, S. Takata, Y. Kurio, T. Maeno, Kanazawa Institute of Technology, Ishikawa, Japan; SID 95 Digest, pp. 724–727 no date.

Efficiency of $Dy^{3+}$–Activated Phosphors; J.L. Sommerijk and A. Bril; Philips Research Laboratories, Eindhoven, Netherlands, J. Electrochem, Soc.: Solid–State Science and Technology, Jul. 1975, pp. 952–954.

DOPED AMORPHOUS AND CRYSTALLINE GALLIUM OXIDES, ALKALINE EARTH GALLATES AND DOPED ZINC GERMANATE PHOSPHORS AS ELECTROLUMINESCENT MATERIALS

This application claims the benefits of U.S. Provisional Application 60/000,781, filed Jul. 5, 1996.

FIELD OF THE INVENTION

The present invention relates to new phosphor materials exhibiting electroluminescence based on gallium oxide and methods for their production. More particularly, the invention relates to rare earth doped amorphous and crystalline alkaline earth gallate phosphors and rare earth doped amorphous and crystalline gallium oxide and methods for making these materials. The present invention also relates to new doped germanium oxide, $Zn_2Si_xGe_{1-x}O_4$:Mn for use as electroluminescent display materials.

BACKGROUND OF THE INVENTION

Electroluminescence (EL) occurs by the emission of light from a phosphor in response to a sufficiently high electric field developed across the phosphor. Phosphor refers to those materials which emit light in response to the application of a field across the material. Thin film electroluminescent devices have a basic structure comprising a phosphor film or layer sandwiched between two electrodes. EL laminates are typically made by depositing the various layers onto a substrate such as quartz or glass, first a reflective metal layer onto the substrate onto which an insulating dielectric layer is deposited. The phosphor layer is then deposited onto the dielectric layer and then an optically transparent electrode, typically a transparent conducting oxide such as ITO is deposited onto the top surface of the phosphor layer. Application of an effective voltage between the two electrodes produces the electric field strength required to induce electroluminescence in the phosphor. The role of the dielectric layer is to reduce the voltage drop across the phosphor layer to avoid dielectric breakdown of the phosphor.

There is strong commercial interest to achieve the full spectral range in electroluminescent phosphors for visible display application and in particular for making colour flat panel displays. Sulphide phosphors are well known as efficient light emitters in electroluminescence as discussed in T. Inoguchi, M. Takeda, Y. Kakihara, Y. Nakata, M. Yoshida, SID'74 Digest, p. 84–85, 1974. These include ZnS:Mn and SrS:Ce. A significant drawback to these phosphors is that they are moisture sensitive and are prone to reacting with oxygen especially when electrically driven. Known electroluminescent materials being studied include materials such as SrS:RE, see W. A. Barrow, R. E. Coovert, C. N. King, Digest 1984 SID International Symposium, Los Angeles, p. 249, $SrGa_2S_4$:RE and $CaGa_2S_4$:RE as disclosed in W. A. Barrow, R. C. Coovert, E. Dickey, C. N. King, C. Laakso, S. S. Sun, R. T Tuenge, R. Wentross, Digest 1993 SID International Symposium, Seattle, p. 761; W. Halverson, T. Parodos, P. Colter, Display Phosphors Conference, San Diego, Nov. 13–16, 1995, p. 115; S. S. Sun, E. Dickey, R. Tuenge, R. Wentross, Display Phosphors Conference, San Diego, Nov. 13–16, 1995, p. 119; T. Yang, M. Chaichimansour, W. Park, B. K. Wagner, C. J. Summers, Display Phosphors Conference, San Diego, Nov. 13–16, 1995, p. 123; and T. S. Moss, D. C. Smith, J. A. Samuels, R. C. Dye, Display Phosphors Conference, San Diego, Nov. 13–16, 1995, p. 127. While these materials do achieve red, green and blue emission, the gallium based sulphides suffer from low brightness, difficulty of preparation and stability problems.

It has recently been demonstrated that in the gallate based family of materials, $ZnGa_2O_4$:Mn could achieve bright and stable electroluminescence, see T. Minami, S. Takata, Y. Kuroi, T. Maeno, Digest 1995 SID International Symposium, Orlando, p. 724; and T. Minami, Y. Kuroi, S. Takata, Display Phosphors Conference, San Diego, Nov. 13–16, 1995, p. 91. They obtained good green emission (200 cd/m$^2$ at 60 Hz at up to 0.9 lm/w) but only obtained 0.5 cd/m$^2$ blue, and 11.0 cd/m$^2$ red at a drive frequency of 1000 Hz, which are not practical brightness values for a display by replacing Mn with Ce and Eu, respectively. They annealed these phosphor materials at 1020° C. in argon.

More recently, Minami et al. have doped $ZnGa_2O_4$ with chromium to generate a better red phosphor, claiming 120 cd/m$^2$ at 1000 Hz, as disclosed in T. Minami, Y. Kuroi, S. Takata, T. Miyata, presented at Asia Display '95, October 16–18, Hamamatsu. However it is not feasible, to achieve full colour in $ZnGa_2O_4$ since rare earths are not compatible with this host lattice due to the size mismatch between Zn or Ga and the rare earth ions.

In the binary gallium oxide based system, $\beta$-$Ga_2O_3$ has the θ-alumina type structure with two different Ga sites, one in tetrahedral coordination and the other in octahedral coordination. High temperature heat treated $\beta$-$Ga_2O_3$ is known to exhibit bright broad-band photoluminescence under 254 nm UV irradiation and cathodoluminescence between 340 and 650 nm as disclosed in W. C. Herbert, H. B. Minnier and J. J. Brown, Jr., *J. Electrochem. Soc.* vol. 116, pp. 1019–1021 (1969). $\beta$-$Ga_2O_3$:Cr, the gallium analog of ruby, has been studied as a potential red to infrared tunable laser material because of the broad-band emission between 650 and 950 nm that is associated with the $^4T_2$–$^4A_2$ transition of the $Cr^{3+}$ ion in the octahedral site, see for example H. H. Tippins, *Phys. Rev.* vol. 137, pp. A865–A871 (1965), and D. Vivien, B. Viana, A. Revcolevschi, J. D. Barde, B. Dunn, P. Nelson and O. M. Stafsudd, *J. Lum.* vol. 39, pp. 29–33 (1987).

Even though there exists a significant difference in ionic radii of the rare earth ions and $Ga^{3+}$, $Ga_2O_3$:Dy was reported to be a reasonably efficient photoluminescent phosphor with characteristic narrow $Dy^{3+}$ lines in the blue (470–500 nm) and the yellow (570–600 nm) regions, see W. C. Herbert, H. B. Minnier and J. J. Brown, *J. Electrochem. Soc.* vol. 115, pp. 104–105 (1968). Other common rare earth dopants such as $Eu^{3+}$ and $Tb^{3+}$, however, did not show efficient PL emission in $\beta$-$Ga_2O_3$, see J. L. Sommerdijk and A. Bril, *J. Electrochem. Soc.* vol 122, pp. 952–954 (1975). Sommerdijk also disclosed the solubility of $Dy^{3+}$ in $\beta$-$Ga_2O_3$ to be only about 1%. W. C. Herbert, H. B. Minnier and J. J. Brown, *J. Electrochem. Soc.* vol. 115, pp. 104–105 (1968) disclosed that maximum PL brightness occurred in the range of 5–10% (mole percent) Dy concentration. The mechanism of the rare earth activation is still not clear.

Recently it has been demonstrated that $Zn_2SiO_4$:Mn could achieve electroluminescence, see T. Miyata, T. Minami, Y. Honda and S. Takata, SID '91 Digest, p. 286–289, 1991. Thin films were RF magnetron sputtered onto polished $BaTiO_3$ substrates using the method disclosed in T. Minami, T. Miyata, S. Takata, I. Fukuda, SID'92 Digest, p. 162. A good brightness of 200 cd/m$^2$ was achieved at 60 Hz with an efficiency of 0.8 lm/W. A drawback to these films is that they had to be annealed at 1000° C. for several hours, which severely limits their applicability to practical substrates for displays.

As mentioned above, a major drawback to known electroluminescent materials is the need for post fabrication high temperature annealing (in the vicinity of 1000° C.) of the films to produce electroluminescent behaviour. This need for high temperature treatment results in severe restrictions in the choice of substrates with only a limited number being available for use under these conditions. High temperature annealing also increases the cost of producing EL films rapidly on a large scale. Another limitation of many electroluminescent materials is that they are restricted to emitting at particular wavelengths or in a relatively narrow wavelength range, such as yellow ZnS:Mn or blue-green SrS:Ce which are not ideal for color displays that requires emission in the red, green and blue parts of the visible spectrum. Electroluminescent materials based on sulphides inherently suffer from chemical stability problems such as oxide formation (since oxides are generally thermodynamically more stable than sulphides) which changes the electronic properties of the material over time.

The classic EL phosphor, ZnS:Mn, is yellow and has a peak wavelength of 580 nm. However, while it may be filtered red and green, most of the light is lost because only $\leq 10\%$ of the light is passed through the red and green filters. Similarly, a drawback of SrS:Ce, which is green-blue, is that only about 10% of the light is passed through a blue filter.

In the rare-earth doped oxides, narrow peaks that are red, green or blue result from dopants $Eu^{+3}$ or $Tb^{+3}$ so that little or no light is generated at wavelengths that are positioned in the visible spectrum away from the desired red, green and blue wavelengths.

It would therefore be very advantageous to provide a method of producing new electroluminescent materials which can be deposited at temperatures well below 1000° C. thereby avoiding the requirement for high temperature annealing. It would also be advantageous to provide new electroluminescent materials which emit over a broader portion of the visible spectrum than known EL materials. More specifically it would be very advantageous to provide a white phosphor, and phosphors with red, green and blue emission.

It would also be advantageous to provide a method of producing new EL materials that are chemically stable and do not react appreciably with water or oxygen and provide stable EL performance in which the brightness is maintained substantially constant during operation. Known color phosphors such as SrS:Ce and other sulphides are not stable in these respects.

SUMMARY OF THE INVENTION

It is an object of the present invention to provide new electroluminescent materials based on oxides of gallium and germanium which exhibit electroluminescent behaviour over the visible portion of the electromagnetic spectrum useful in color electroluminescent flat panel displays. It is also an object of the present invention to provide a method of producing these new films which does not require post production high temperature annealing of the films in order to achieve electroluminescent behaviour.

A significant commercial advantage of the present invention is that several new germanium and gallium oxide based electroluminescent materials have been produced onto substrates at low temperatures and excellent electroluminescent behaviour has been obtained without the need for high temperature annealing as is common in other known systems. As deposited films of $Ga_2O_3$:Eu and films of $Ca_3Ga_2O_6$:Eu and $Zn_2GeO_4$:Mn annealed at temperatures as low as 600° C. exhibit excellent electroluminescent properties. Therefore a very significant advantage of the present invention is that the new electroluminescent materials can be deposited onto a wide variety of substrates not normally useable as substrates for EL materials with those known oxide EL materials requiring high temperature annealing to produce electroluminescence.

Another commercially significant advantage of the present invention is that it provides new electroluminescent materials characterized as green, red and white phosphors which exhibit electroluminescence over the visible spectrum raffler than emissions centred around a specific wavelength region, such as the yellow regions alone.

The inventors report for the first time electroluminescence of amorphous and crystalline Eu-doped gallium oxide, $Ga_2O_3$:Eu, and other related systems. In one aspect of the present invention, there is provided films of doped amorphous and crystalline gallium oxides, $Ga_2O_3$:Eu and $Ga_2O_3$:Eu,Cd exhibiting bright orange red electroluminescence.

The present invention also provides new gallate based oxides such as $CaGa_2O_4$, $SrGa_2O_4$ and $BaGa_2O_4$ which have been prepared in such a way as to exhibit superior electroluminescent properties including EL efficiencies and brightnesses. The invention also provides other calcium and strontium gallates such as $Ca_3Ga_2O_6$, $CaGa_4O_7$ and $Sr_3Ga_4O_9$ which are also found to exhibit excellent EL. The structures of $SrGa_2O_4$ and $BaGa_2O_4$ are stuffed tridymite and that of $CaGa_2O_4$ is orthorhombic. The other two calcium gallates, $Ca_3Ga_2O_6$ and $CaGa_4O_7$, crystallize in orthorhombic and monoclinic forms, respectively. Rare earth dopants are generally soluble in Sr, Ca and Ba compounds.

The present invention also provides a method for producing new electroluminescent zinc silicate-germanate films at lower annealing temperatures thereby permitting the use of more practical substrates. In this aspect of the invention there is provided a method of producing electroluminescent films at temperatures in the vicinity of 700° C. The process comprises replacing Si by Ge in $Zn_2SiO_4$:Mn films to produce films of $Zn_2Si_xGe_{1-x}O_4$:Mn exhibiting electroluminescent where x is in the range from about 0 to about 1.0.

In one aspect of the invention there is provided a new phosphor having the formula $Ga_2O_3$:n%RE, wherein RE is a rare earth dopant selected from the group consisting of Fu and Dy, n % is the mole percent of RE present in $Ga_2O_3$ and spans the range in which the rare earth is soluble in $Ga_2O_3$, the phosphor being characterized by electroluminescence when an effective voltage is applied across the phosphor.

The invention provides a phosphor having the formula $Ga_2O_3$:n%Eu,Cd, wherein n % is the mole percent of a combined amount of Eu and Cd present in $Ga_2O_3$ and spans the range in which the combined amount of Eu and Cd are soluble in $Ga_2O_3$, the phosphor being characterized by electroluminescence when an effective voltage is applied across the phosphor.

The invention also provides a phosphor having the formula $SrGa_2O_4$:n%RE wherein RE is a rare earth dopant selected from the group consisting of Eu, Tb and combinations thereof, n % is the mole percent of RE present in $SrGa_2O_4$, and spans the range in which the rare earths are soluble in $SrGa_2O_4$, the phosphor being characterized by electroluminescence when an effective voltage is applied across the phosphor.

In another aspect of the invention there is provided a phosphor having the formula $CaGa_2O_4$:n%RE wherein RE is a rare earth dopant selected from the group consisting of Eu, Tb, Pr and combinations thereof, n % is the mole percent of RE present in $CaGa_2O_4$, and spans the range in which the rare earths are soluble in $CaGa_2O_4$, the phosphor being characterized by electroluminescence when an effective voltage is applied across the phosphor.

The invention also provides a phosphor having the formula $BaGa_2O_4$:n%RE wherein RE is a rare earth dopant selected from the group consisting of Eu and Tb and combinations thereof, n % is the mole percent of RE present in $BaGa_2O_4$, and spans the range in which the rare earths are soluble in $BaGa_2O_4$, the phosphor characterized by electroluminescence when an effective voltage is applied across the phosphor.

The invention also provides a phosphor having the formula $Ca_3Ga_2O_6$:n%RE wherein RE is a rare earth dopant selected from the group consisting of Eu and Tb and combinations thereof, n % is the mole percent of RE present in $Ca_3Ga_2O_6$, and spans the range in which these rare earths are soluble in $Ca_3Ga_2O_6$, the phosphor being characterized by electroluminescence when an effective voltage is applied across the phosphor.

In another aspect of the invention there is provided a phosphor having the formula $CaGa_4O_7$:n%RE wherein RE is a rare earth dopant selected from the group consisting of Eu, Dy, Tb and combinations thereof, n % is the mole percent of RE present in $CaGa_4O_2$, and spans the range in which the rare earths are soluble in $CaGa_4O_7$, the phosphor being characterized by electroluminescence when an effective voltage is applied across the phosphor.

In another aspect of the invention there is provided a phosphor having the formula $Zn_2Si_xGe_{1-x}O_4$:n%Mn, wherein n % is the mole percent of Mn and spans the range in which Mn is soluble in $Zn_2Si_xGe_{1-x}O_4$, and x varies in the range from about 0 to about 1.0, the phosphor being characterized by electroluminescence when an effective voltage is applied across the phosphor.

BRIEF DESCRIPTION OF THE DRAWINGS

The new phosphor materials exhibiting electroluminescent behaviour forming the present invention will now be described, by way of example only, reference being had to the accompanying drawings, in which.

DETAILED DESCRIPTION OF THE INVENTION

As used herein, the term phosphor refers to substances which exhibit electroluminescence when a suitable or effective electric field is developed across the phosphor. The various elements used in the production of the new EL oxide based materials disclosed herein include gallium (Ga), germanium (Ge), silicon (Si), manganese (Mn), zinc (Zn), europium (Eu), terbium (Tb), cerium (Ce), dysprosium (Dy), cadmium (Cd), strontium (Sr), barium (Ba), calcium (Ca) and praseodymium (Pr).

A) NEW DOPED GALLIUM OXIDES EXHIBITING ELECTROLUMINESCENT BEHAVIOUR

Film Preparation

Target materials were intimate mixtures of $Ga_2O_3$ (Alfa Aesar, 99.999%) and appropriate amounts of rare earth (RE) oxide dopants. For the $Ga_2O_3$:(0.01 to 15% RE) where RE is Eu, Dy or mixtures thereof, powder mixtures of the $Ga_2O_3$ with the appropriate dopant oxide(s) in the desired ratio were ground together in a mortar. Thin films were deposited on polished AVX $BaTiO_3$ substrates by RF magnetron sputtering using the mixed powder targets. All substrates are a $BaTiO_3$-based ferroelectric ceramic made by green sheet processing (AVX Corp).

Figure 1:
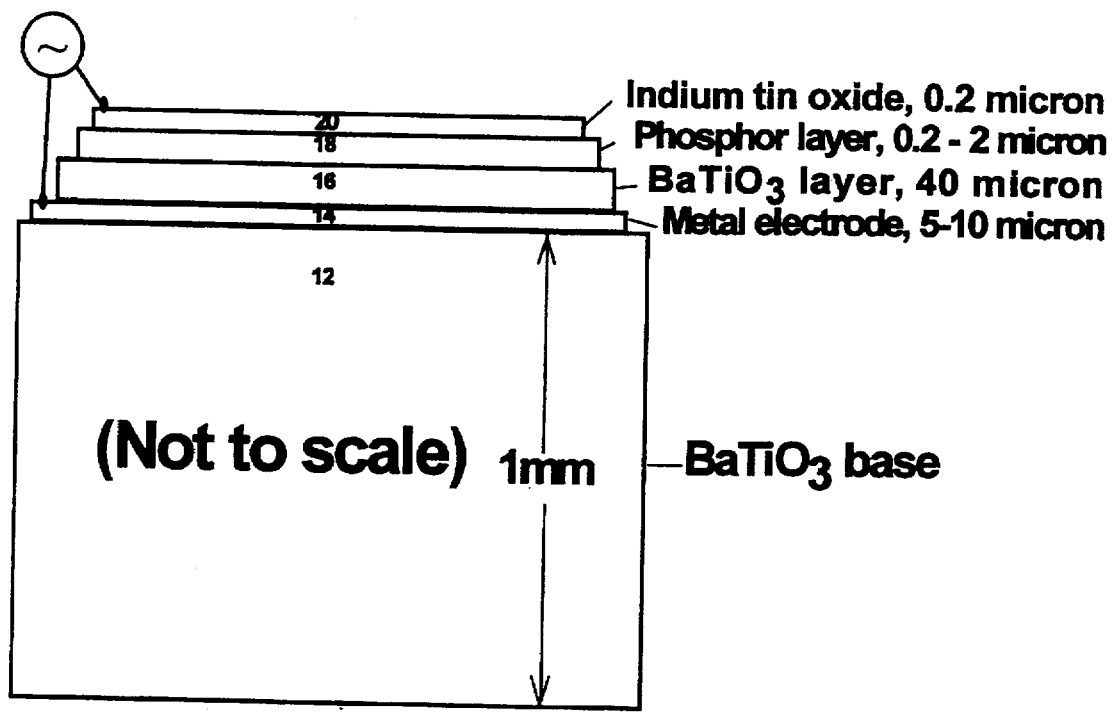
FIG. 1 is a side view of an EL device structure using a commercial barium titanate substrate produced by AVX Corp.

Referring to FIG. 1, a multi-layer thick film stack was manufactured to incorporate a $BaTiO_3$ underlayer 12, a screen-printed metal electrode 14 and finally a $BaTiO_3$ layer 16, 40 µm thick on the surface of electrode 14. Impurities that are commonly incorporated in the $BaTiO_3$ in industry allow the substrates to have the desired dielectric constant ($\epsilon_r$=9000), temperature dependence and other properties. The phosphor layer 18 was deposited by sputtering which was effected with a 2" US gun at a substrate temperature between 200°–250° C. in an atmosphere of 10% $O_2$ in argon and a pressure of 10 mTorr unless otherwise noted. The substrate holder was rotated in a planetary motion and the film thickness variation was less than 10%. Typical phosphor film thickness was 4000–8000 Å. The sputter deposited thin films were either annealed in air at 600° C. to 950° C. for one hour or not annealed. A transparent indium tin oxide (ITO) top electrode layer 20 of 2000 Å was also deposited by sputtering. The EL brightness was measured with a Minolta LS-100 luminance meter. EL efficiencies were measured by the Sawyer-Tower method. Emission spectra were taken with a computer-controlled SPEX 340E spectrometer.

Results

1. $Ga_2O_3$:Eu

Figure 2:
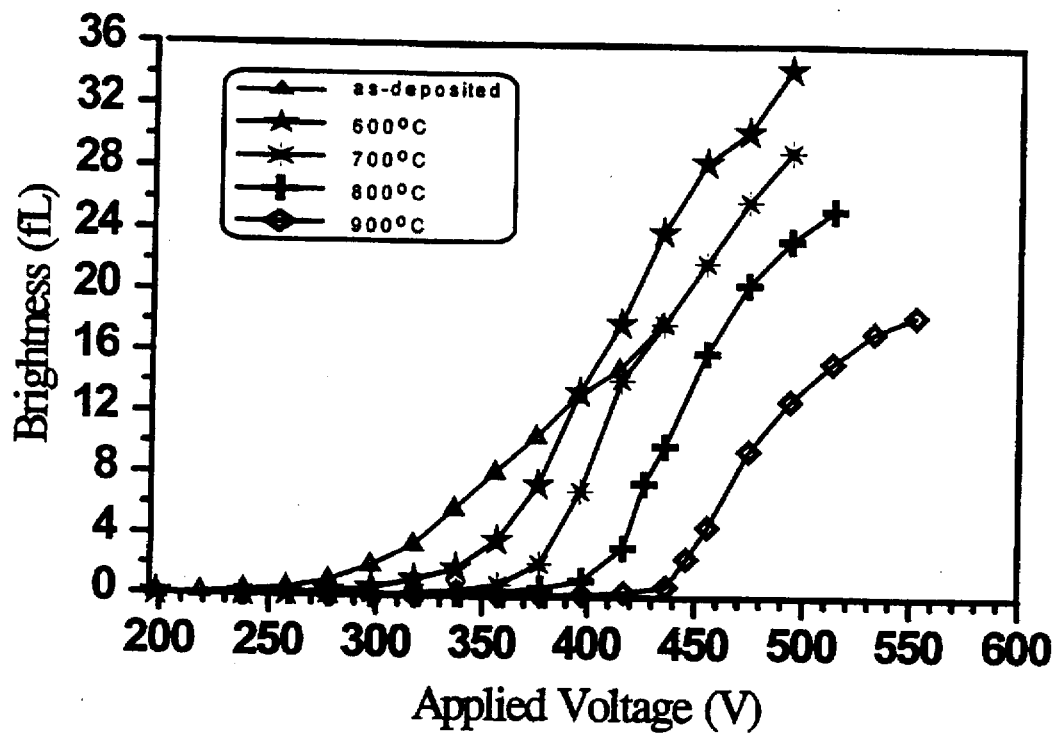
FIG. 2 is a plot of brightness versus applied voltage of several thin films (8000 Å) of $Ga_2O_3$:2% Eu each annealed at the temperature indicated for one hour.
Figure 3:
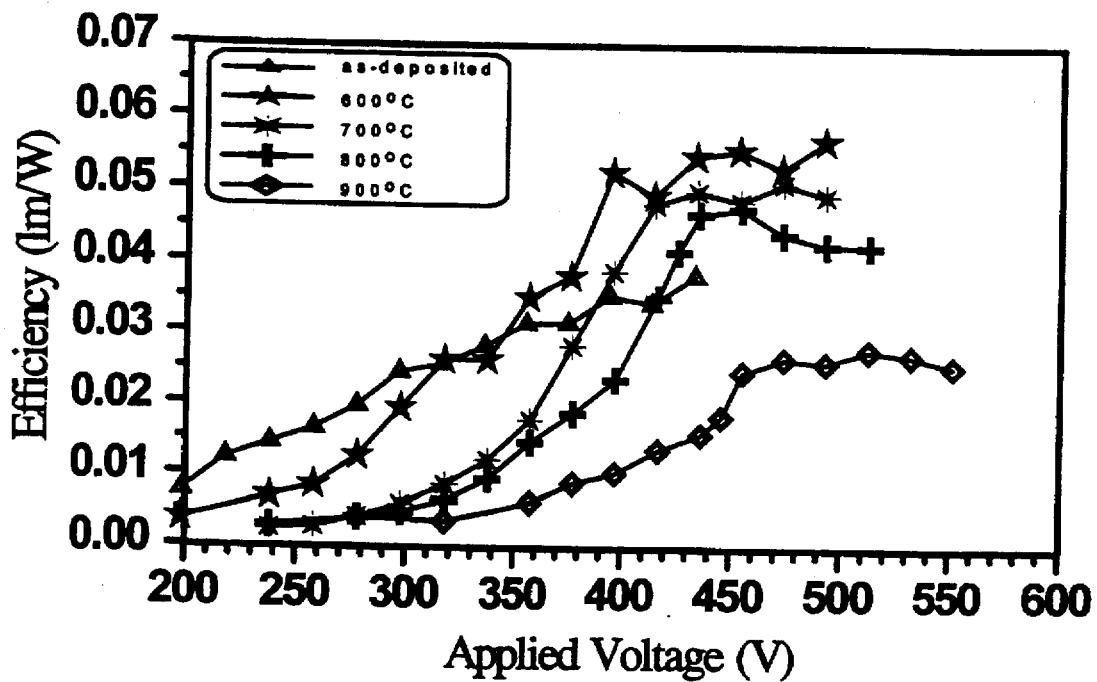
FIG. 3 is a plot of the voltage dependancy of the electroluminescence efficiency for the thin film samples of FIG. 2.

Bright orange red electroluminescence (EL) characteristic of the $Eu^{3+}$ emission was obtained. Brightness-Voltage (B-V) curves of devices made from thin films with nominal compositions $Ga_2O_3$:2%Eu at a thickness of 8000 Å are shown in FIG. 2. The corresponding efficiencies for these films are shown in FIG. 3. The results clearly indicate that the threshold voltage, $V_{th}$, increases with increasing annealing temperature. Except for the as-deposited thin films, the brightness and efficiency increase with decreasing annealing temperature as well. The optimum annealing temperature appears to be lower than 700° C.

Figure 4:
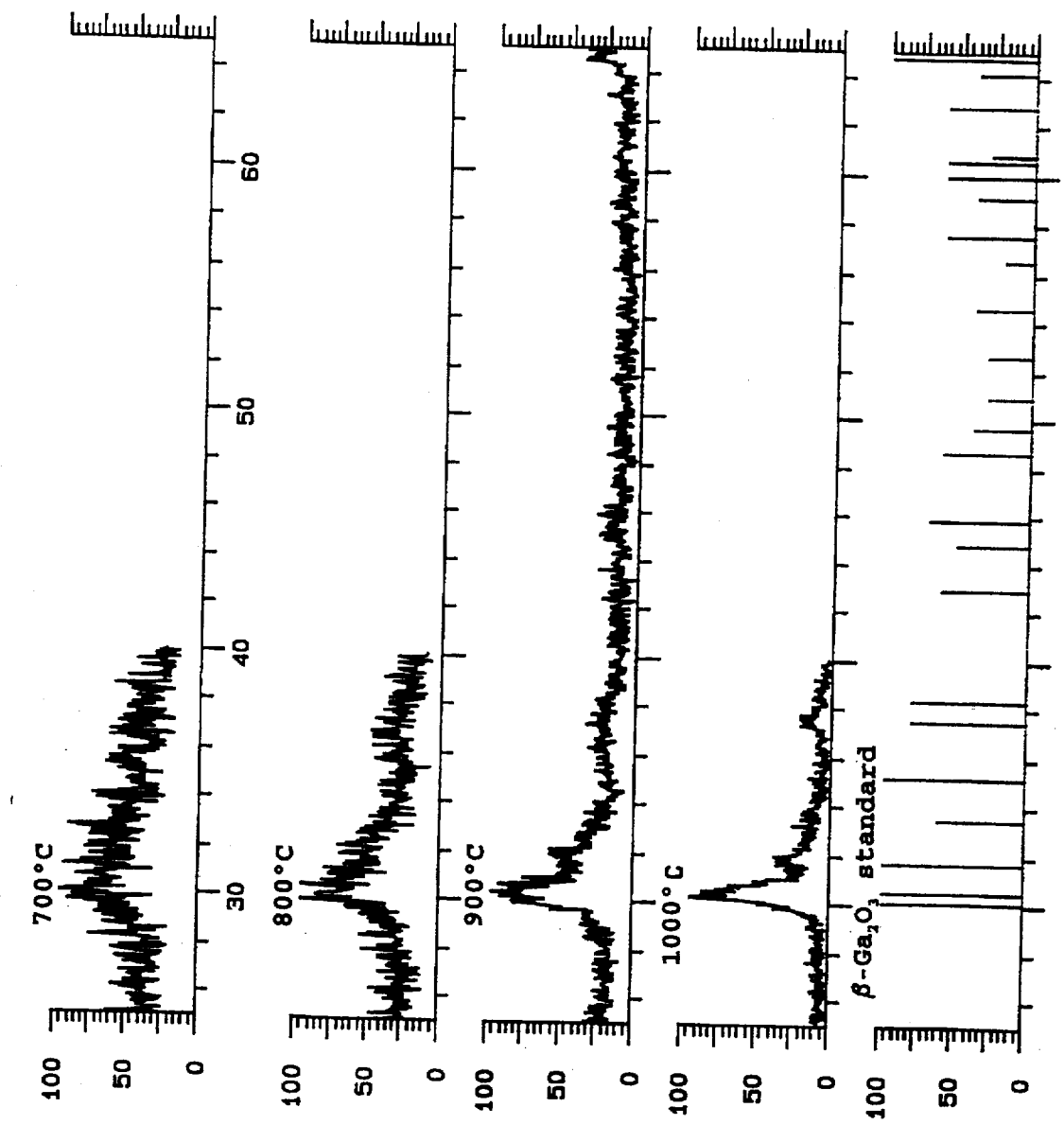
FIG. 4 illustrates the x-ray diffraction patterns of $Ga_2O_3$:1%Eu thin films deposited on Si and annealed at the different temperatures shown.

X-ray diffraction patterns of $Ga_2O_3$:1%Eu thin films deposited on Si and annealed at various temperatures are shown in FIG. 4. Even with 800° C. annealing the thin film was still poorly crystallized. Below 700° C. the thin film was essentially amorphous. It was not well crystallized until annealed at about 1000° C. These results suggest that there is no obvious correlation between the EL properties and the crystallinity of the thin films.

Figure 5:
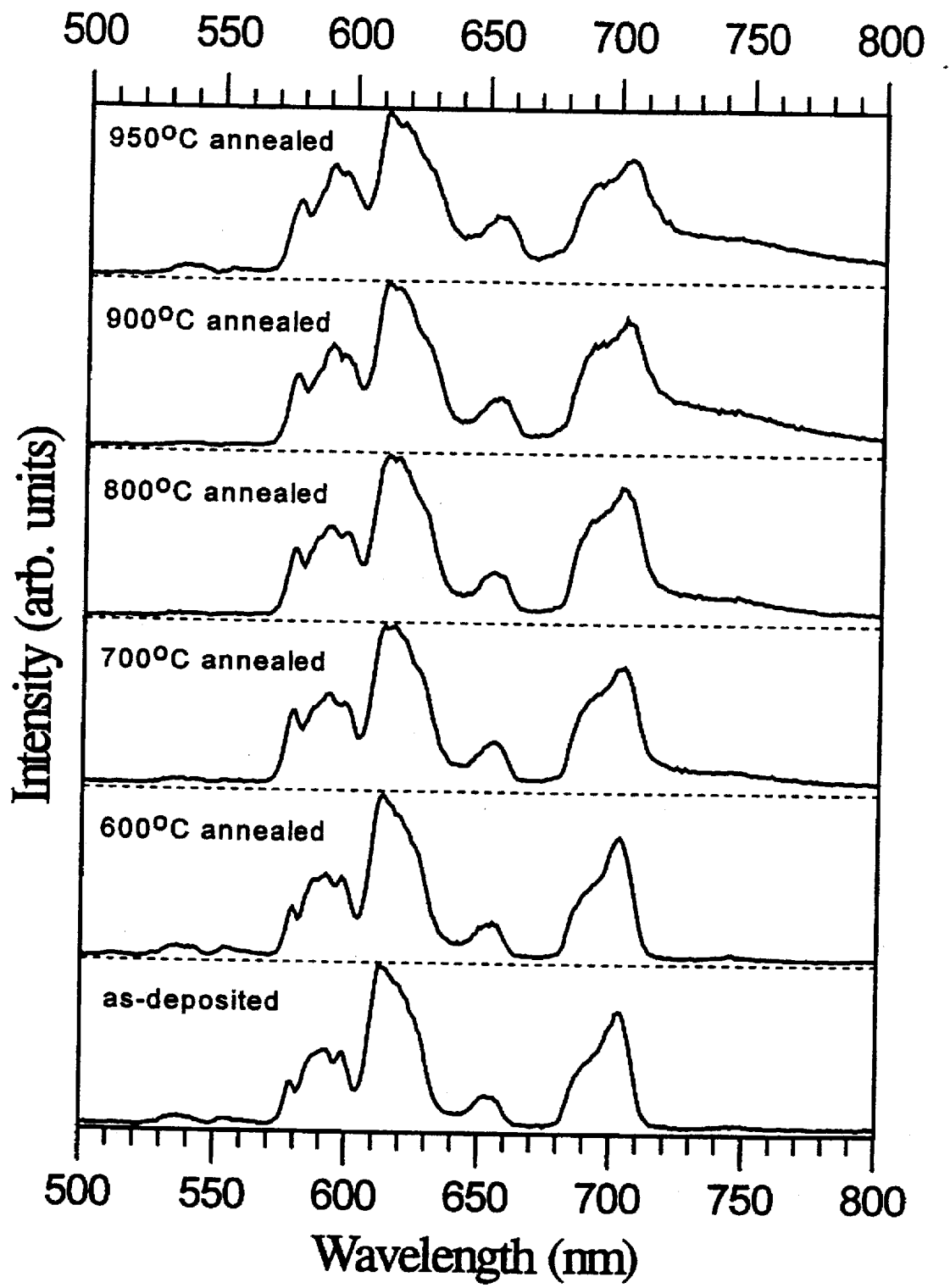
FIG. 5 compares the electroluminescence spectra of $Ga_2O_3$:2% Eu thin films annealed at the indicated temperatures.

The EL spectra of $Ga_2O_3$:2%Eu thin films annealed at various temperatures are compared in FIG. 5. There is very little difference in the line shape as well as the line width, indicating again that the emission of $Eu^{3+}$ is very much independent of the host lattice. To the inventors' knowledge this surprising behavior has never been reported before. ZnS:Tb is a well-known example of an efficient EL (green) phosphor with a size-mismatched dopant, but good crystallinity is known to be important in the generation of EL in ZnS-related phosphors.

The notable increase in the emission intensity above 700 nm at annealing temperatures higher than 700° C. appears to be correlated to the crystallinity of the thin film of host material $Ga_2O_3$. As will be shown later, this emission is due to the $\beta$-$Ga_2O_3$ host alone.

Figure 6:
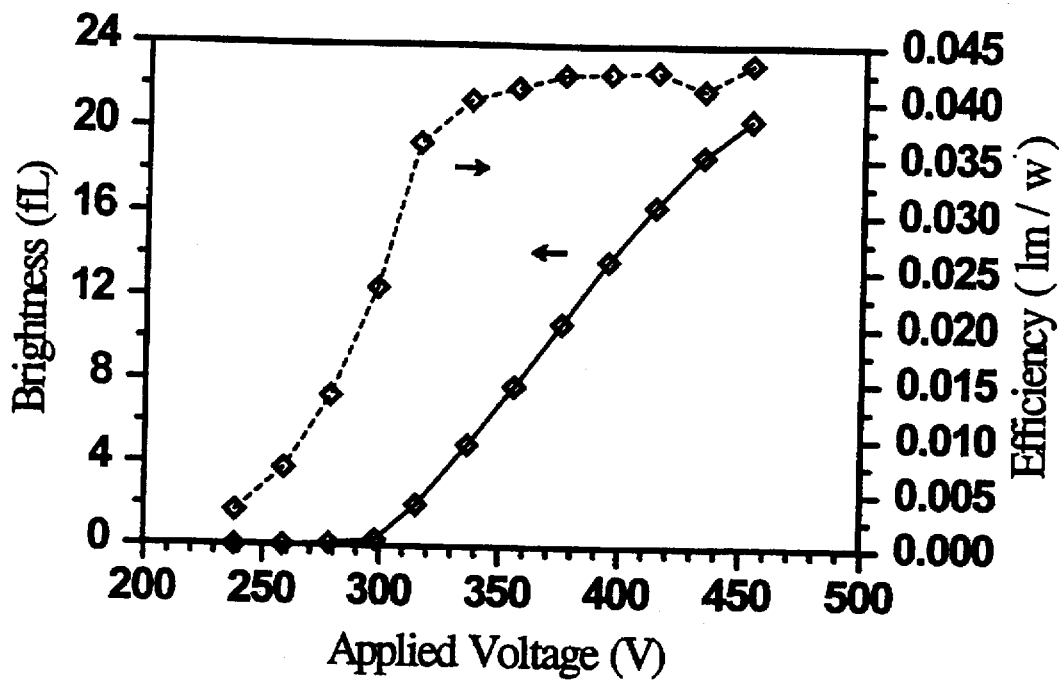
FIG. 6 is a plot of the voltage dependence of both the efficiency and brightness of a device fabricated from $Ga_2O_3$:2% Eu sputtered in a gas mixture of 5% $O_2$ and 5% $N_2$ in argon (Ar), followed by annealing in Ar at 950° C. for 1 hour.

The B-V curves in FIG. 2 show that devices with as-deposited and low temperature annealed thin phosphor films have large clamp voltages, or slow rise in brightness near the threshold. As shown in FIG. 6, a device with $Ga_2O_3$:1%Eu thin film sputtered in a gas mixture of 5% $O_2$ and 5% $N_2$ in argon, followed by annealing in argon at 950° C. for 1 hour, appears to have a sharper turn-on. The use of a $ZnGa_2O_4$ buffer layer (~1000 Å) between the $BaTiO_3$ substrate and the phosphor layer appears to increase the sharpness of the B-V curve as well, data not shown.

2. $Ga_2O_3$:M (M=Cr, Ce, Dy)

Figure 7:
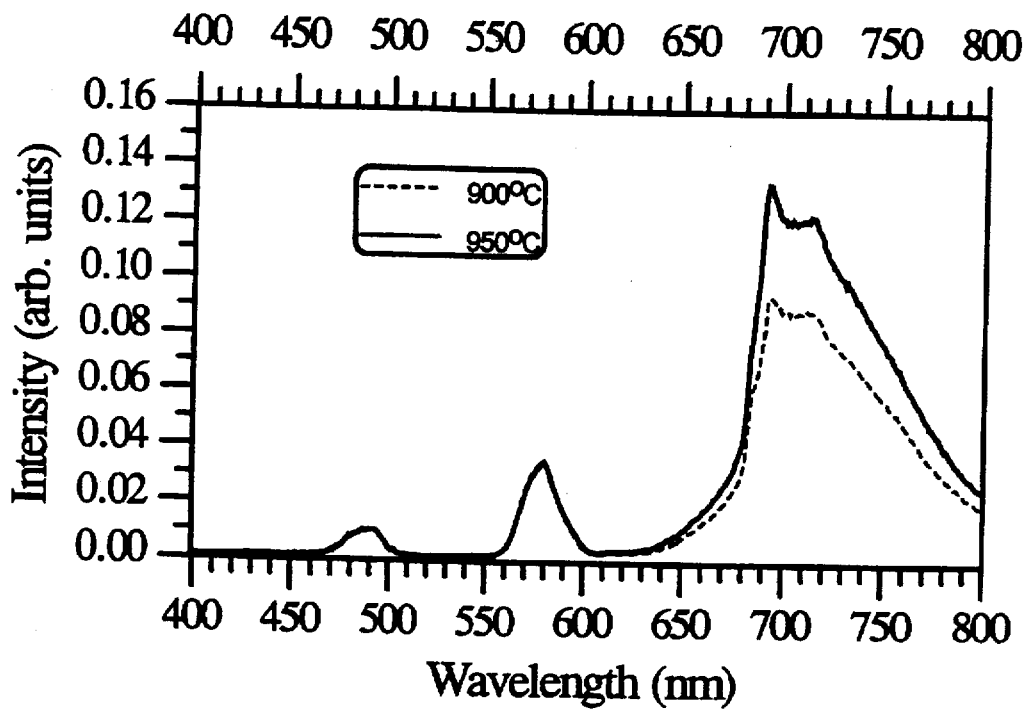
FIG. 7 is a plot the EL spectra for two $Ga_2O_3$:1%Dy films annealed at the indicated temperatures for 1 hour illustrating the presence of deep red emissions similar to the samples of FIG. 5, attributed to to the emission of the $\beta$-$Ga_2O_3$ host lattice.

Even though $Cr^{3+}$ is an ideal dopant for the $\beta$-$Ga_2O_3$ host in terms of charge and size, there is essentially no EL emission observed due to $Cr^{3+}$. The EL spectrum of $Ga_2O_3$:1%Cr is the same as that of $Ga_2O_3$:1%Ce, which was sputtered in an atmosphere of 5% $N_2$ and 5% $O_2$ in argon and annealed at 950° C. in argon. A deep red and near infrared emission in both cases has also been observed for $Ga_2O_3$:Eu as well as in $Ga_2O_3$:1%Dy, see FIG. 7, and is thus clearly due to the emission of the $\beta$-$Ga_2O_3$ host lattice. It is worth noting that a similar red emission in the room temperature photoluminescence spectrum of $Ga_2O_3$:Cr was attributed to the $^4T_2$-$^4A_2$ transition of the $Cr^{3+}$. However, characteristic $Cr^{3+}$ emission, especially the sharp R1 (690 nm) and R2 (697 nm) lines reported in the fluorescence spectrum of $Ga_2O_3$:Cr (see L. P. Sosman, T. Abritta, O. Nakamura and M. M. F. D'Aguiar Neto, J. Mater. Sci. Lett., Vol. 14, pp. 19–20, (1995)) was absent in the EL spectrum. The lack of $Ce^{3+}$ emission was very likely due to the existence of stable $Ce^{4+}$ instead of the desired $Ce^{3+}$. The $Dy^{3+}$ emission appeared as two broad bands at ~490 and 580 nm, in contrast with its photoluminescent emission spectrum of powder specimens where complicated fine structures have been observed even at room temperature.

The EL of $Ga_2O_3$:Dy is much weaker than $Ga_2O_3$:Eu. It is interesting to note that, even with a small concentration (0.5% mole percent) of codoping with europium, a sharp threshold behaviour can be observed which was absent in all devices without europium. In fact, efficient EL has been obtained only in Eu-doped $Ga_2O_3$. These results suggest that europium is playing a very significant role in the charge injection of these EL devices, probably through the ionization of $Eu^{2+}$, which could exist partially in $Ga_2O_3$:Eu.

3. $Ga_2O_3$:Eu,Cd

Figure 8:
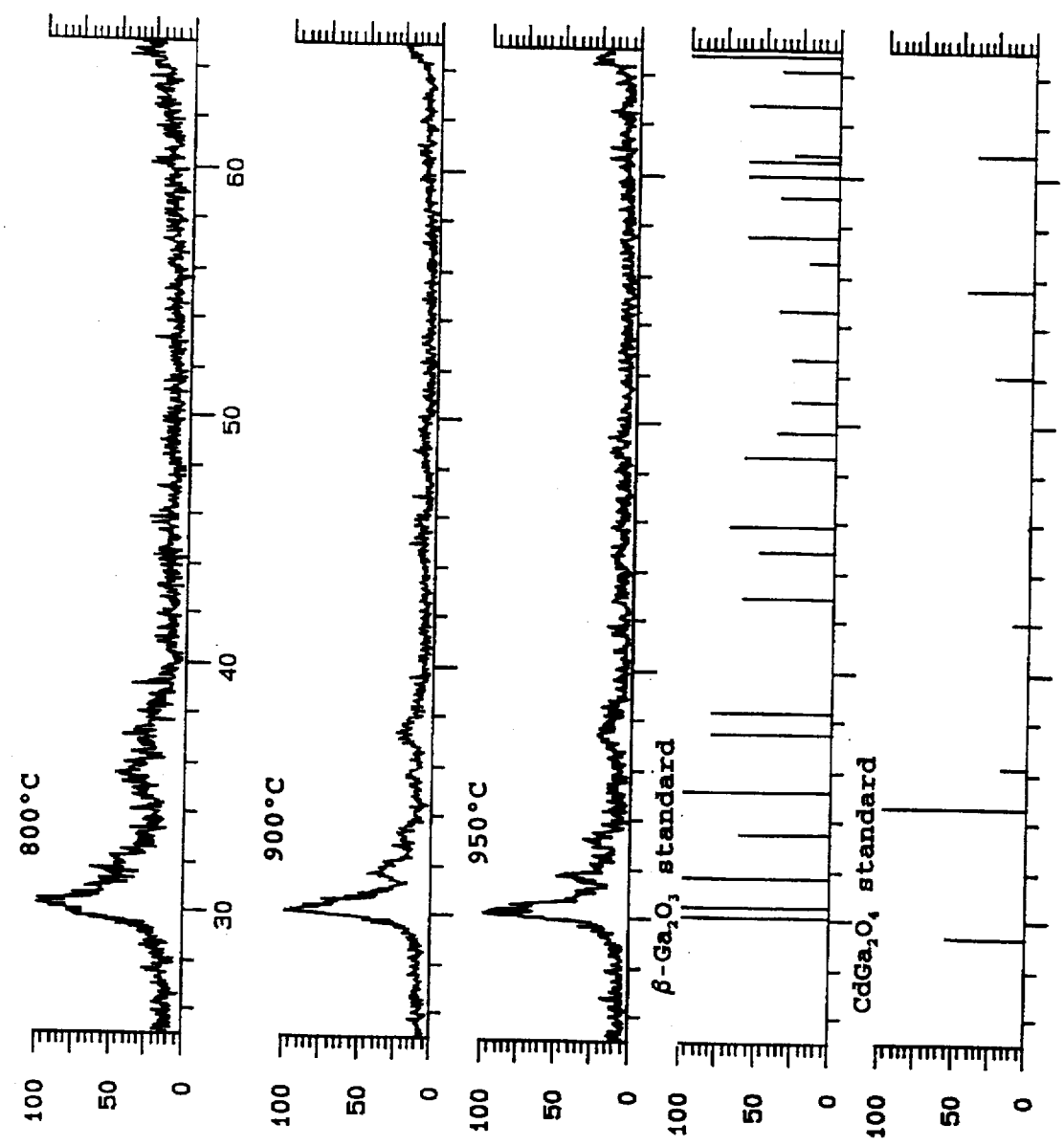
FIG. 8 shows the X-ray diffraction patterns of thin films sputtered from a $CdGa_2O_4$:0.5%Eu target and annealed at the indicated temperatures for one hour.

X-ray diffraction patterns of thin films sputtered from a $CdGa_2O_4$:Eu target and annealed at various temperatures are shown in FIG. 8. The thin films were also amorphous when annealed below 700° C. in air. No spinel $CdGa_2O_4$ phase was observed in the high temperature-annealed thin films. The only phase that could be detected was $\beta$-$Ga_2O_3$. Thus cadmium existed in the thin film only as a dopant, very likely due to the decomposition of CdO. The XRD patterns in FIG. 8 strongly suggest that the Cd-doped $Ga_2O_3$:0.5%Eu,Cd thin films crystallize more easily than $Ga_2O_3$:1%Eu when compared with those in FIG. 4.

Figure 9:
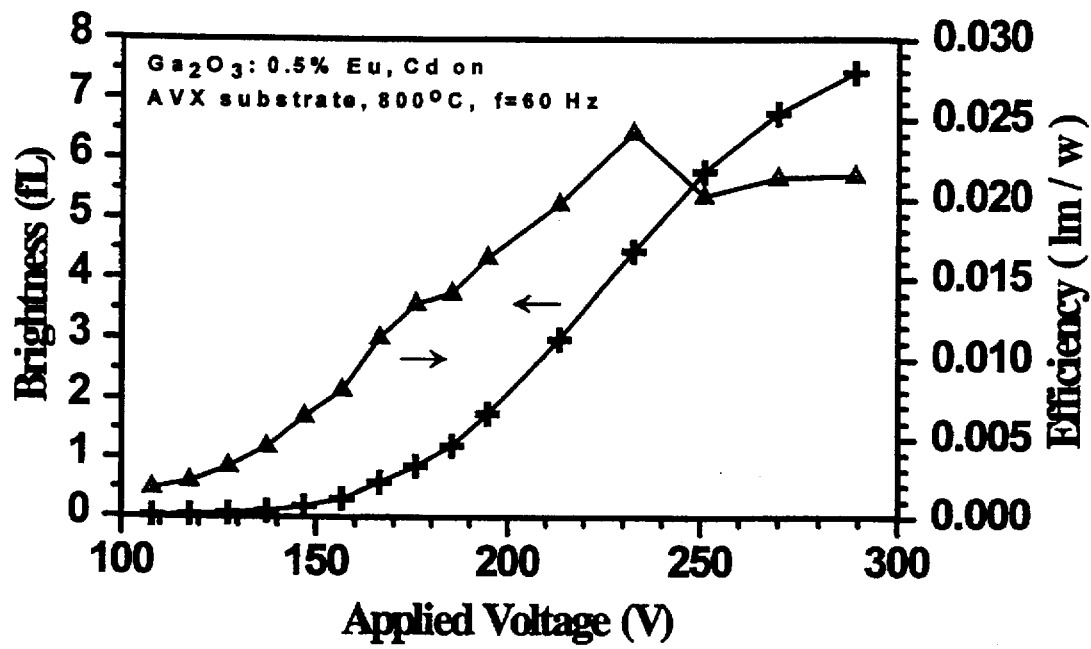
FIG. 9 shows the electroluminescent brightness and efficiency for $Ga_2O_3$:0.5%Eu,Cd thin films annealed at 800° C. for one hour.
Figure 10:
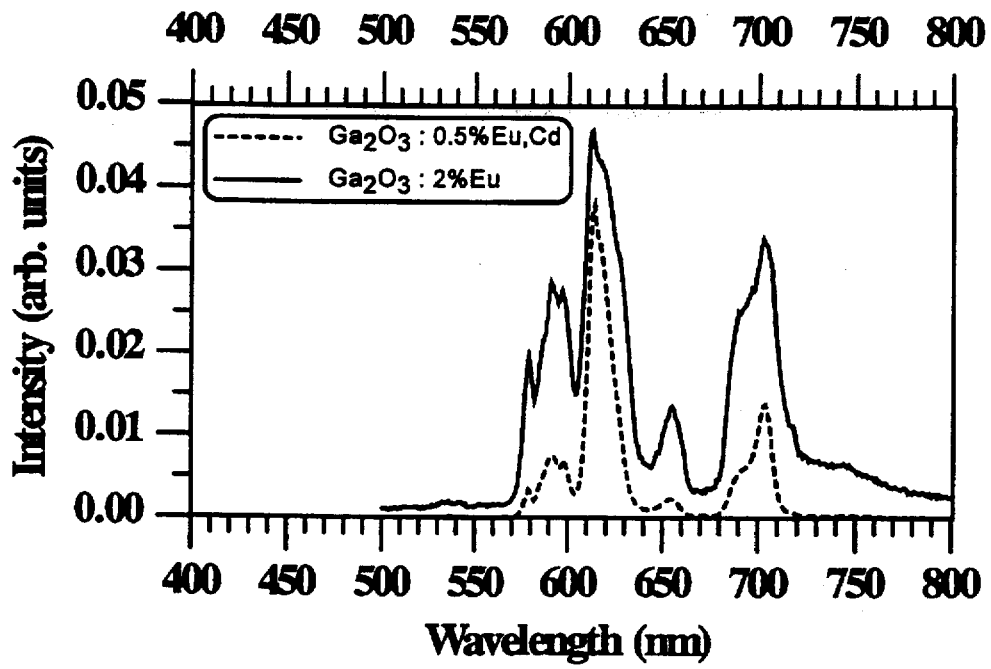
FIG. 10 compares the electroluminescent spectra (intensity versus wavelength) for $Ga_2O_3$:0.5%Eu,Cd and $Ga_2O_3$:2%Eu.

Bright EL was also obtained with $Ga_2O_3$:0.5%Eu,Cd thin films. The brightness and efficiency data for $Ga_2O_3$:0.5%Eu, Cd thin films annealed at 800° C. for one hour in air are shown in FIG. 9. There exists an obvious difference in the EL spectra of $Ga_2O_3$:0.5%Eu,Cd and $Ga_2O_3$:2%Eu as shown in FIG. 10. The relative intensities of peaks at about 580, 655 and 700 nm were substantially weaker for $Ga_2O_3$:0.5%Eu,Cd. These results strongly suggest the existence of cadmium in the thin films although the amount of Cd is not known.

The ionic radii of $Cd^{2+}$ and $Eu^{3+}$ are both too great for a simple substitution of the $Ga^{3+}$ ion. The significant change in the emission spectra with $Cd^{2+}$ codoping probably suggest a very complex association of the $Eu^{3+}$ ion with the host lattice that is sensitive to the existence of other impurities like cadmium. Referring to FIG. 9, it is worth noting that the luminescence levels of the best $Ga_2O_3$:0.5%Eu,Cd films are comparable with those of $Ga_2O_3$:2%Eu even though the $Eu^{3+}$ concentration is much lower in the former. The effects of cadmium doping and the activator ($Eu^{3+}$) concentration on the EL properties are worthy of further investigations.

B) NEW DOPED ALKALINE EARTH GALLATE PHOSPHORS EXHIBITING ELECTROLUMINESCENCE

Film Preparation

Commercial high purity $SrCO_3$ (99%), $BaCO_3$ (99.95%), $Ga_2O_3$ (99.999%) (from Alfa-Aesar), CaO (99.9%) (Aldrich), $Tb_4O_7$ (99.99%), $Eu_2O_3$ (99.9%), $Pr_8O_{11}$ (99.99%) and $Dy_2O_3$ (99.99%) from Rhone-Poulenc, powders were mixed in appropriate ratios and fired at 1000° C. to 1300° C. in air for 12 to 24 hours to form the desired phosphor powder. The compositions of the typical phosphor compounds and their firing conditions are listed in Table 1. The phosphor powders were then pressed and placed in a 2-inch RF magnetron gun (US gun).

An AVX ceramic substrate, as shown in FIG. 1, was placed 4 cm above the gun. Sputtering was carried out at a gas pressure of 20 mtorr to grow thin films measuring 4000 Å to 9000 Å in thickness. Except otherwise indicated, the sputtering atmosphere usually consists of 5% $O_2$ and 95% Ar. It is worth noting that 5–10% $N_2$ gas has also been used when sputtering some Tb-doped phosphors, where nitrogen acts as an effective charge compensator and significantly improves the EL brightness of the resulting film. The thin films were annealed at between 600° C. and 950° C. for 1 hour in air or Ar depending on the phosphors, and a layer of ITO (indium tin oxide) of ~2000 Å was grown by RF magnetron sputtering to form a transparent top electrode. The completed device structures are shown in FIG. 1.

1) $CaGa_2O_4$:RE Phosphors

Figure 11:
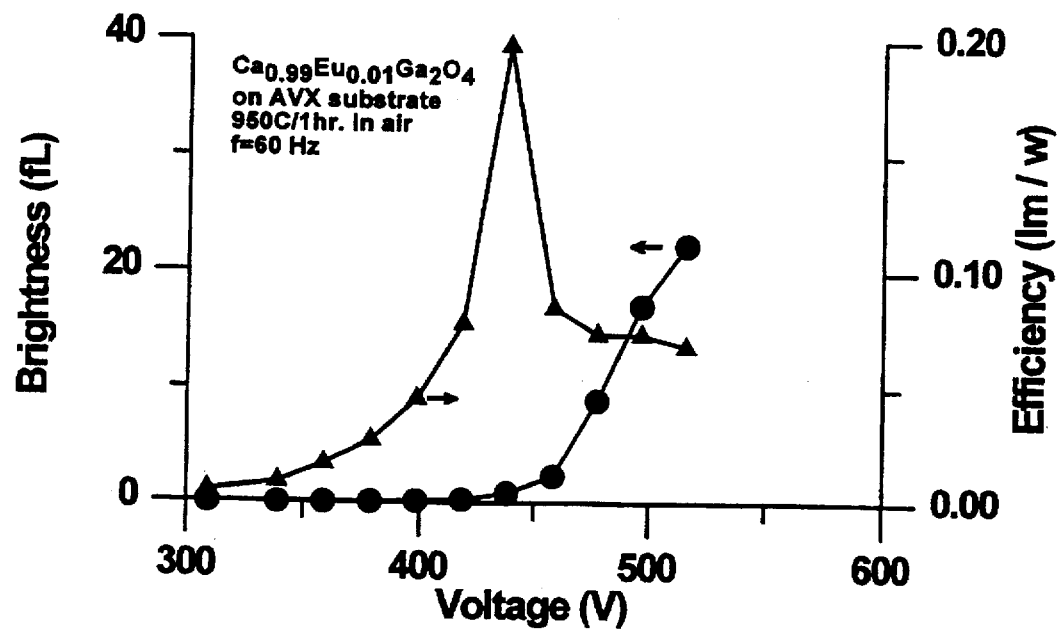
FIG. 11 is a plot of brightness and efficiency versus voltage at 60 Hz for an EL device formed by sputtering a thin film from $Ca_{0.99}Eu_{0.01}Ga_2O_4$ onto an AVX substrate and annealed at 950° C. for one hour in air.
Figure 12:
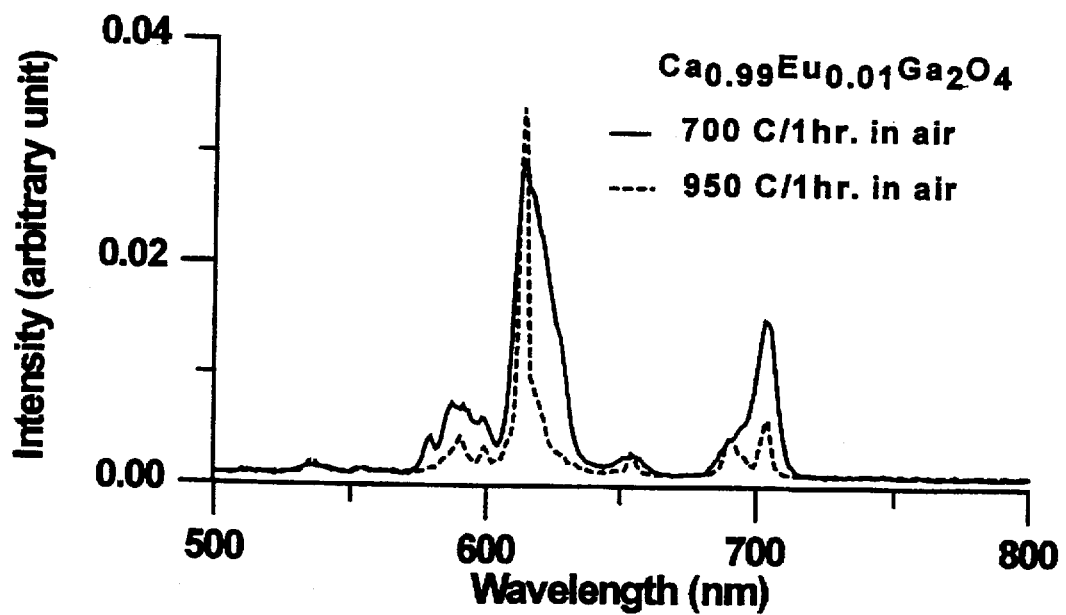
FIG. 12 shows the EL emission spectra for two phosphor films, both sputtered from $Ca_{0.99}Eu_{0.01}Ga_2O_4$ with each annealed according to the indicated conditions.

The Eu doped materials were prepared with about 1% Eu and were sputtered in a mixture of 5% $O_2$ in Ar. The EL brightness and efficiency versus voltage curves at 60 Hz for $Ca_{0.99}Eu_{0.01}Ga_2O_4$ phosphor post-annealed at 950° C. for one hour in air is shown in FIG. 11 and the EL emission spectra for two films post annealed at 950° C. and 700° C. are shown in FIG. 12.

Figure 13:
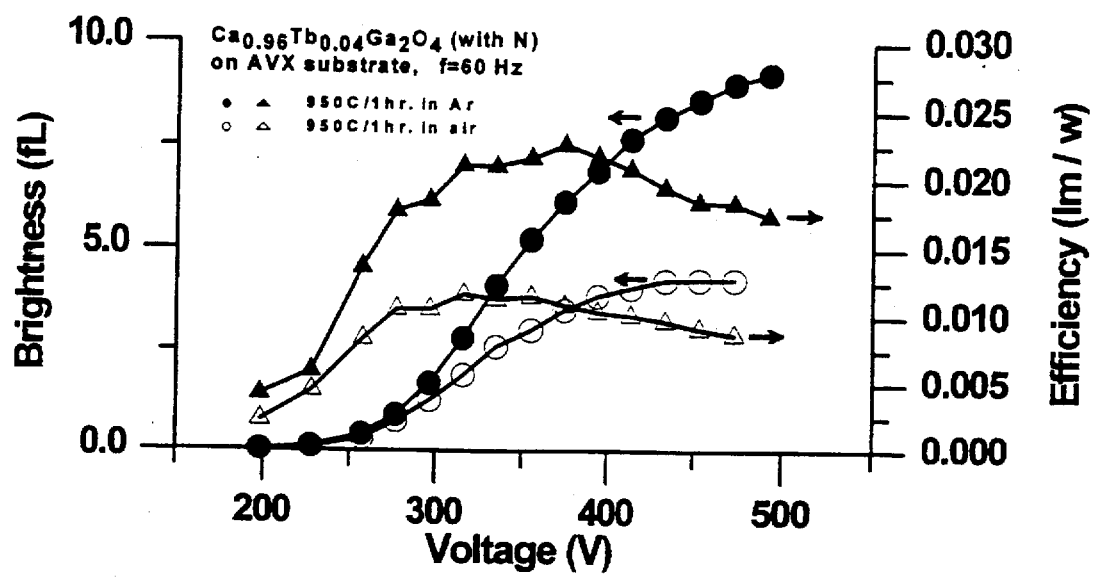
FIG. 13 is a plot of brightness and efficiency versus voltage at 60 Hz for EL phosphor films sputtered from $Ca_{0.96}Tb_{0.04}Ga_2O_4$ on an AVX substrate with each film annealed under the indicated conditions.
Figure 14:
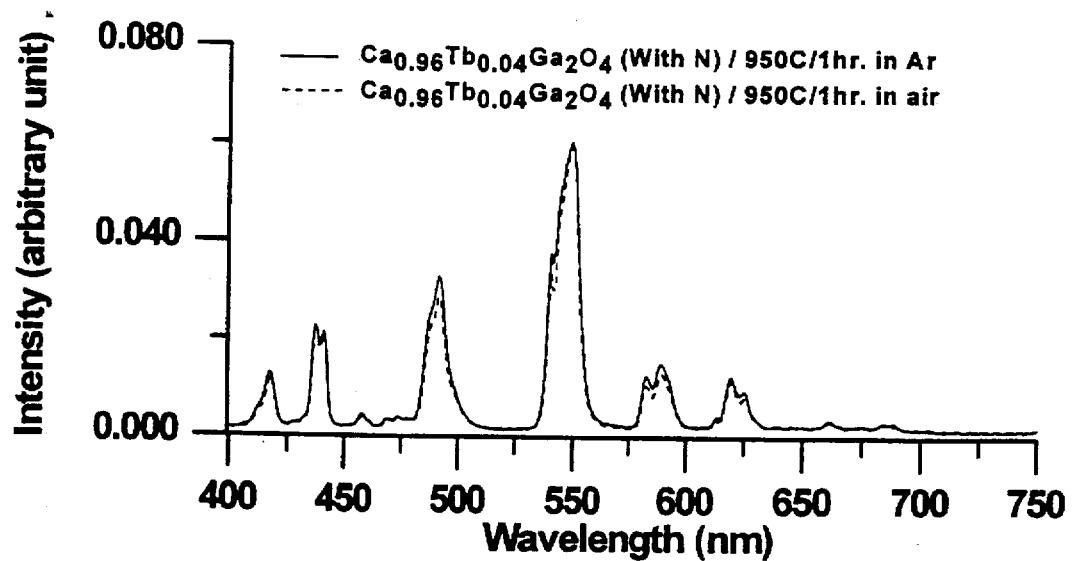
FIG. 14 shows the EL emission spectra for the films of FIG. 13.

Tb doped materials were prepared with between about 0.1% to about 4% Tb. The EL performance at 60 Hz for $Ca_{0.96}Tb_{0.04}Ga_2O_4$ sputtered in 5% $O_2$, 10% $N_2$ and 85% Ar atmosphere and post-annealed at 950° C. for 1 hour in air or Ar, are shown in FIG. 13 and the corresponding EL emission spectra are shown in FIG. 14. It is worth noting that post-annealing in Ar significantly improves the EL brightness as well as the relative intensity of the blue peak situated at 490 nm ($^5D_3 \rightarrow {}^7F_{1,0}$ and $^5D_4 \rightarrow {}^7F_6$ transitions), which makes the overall emission look bluer.

Figure 15:
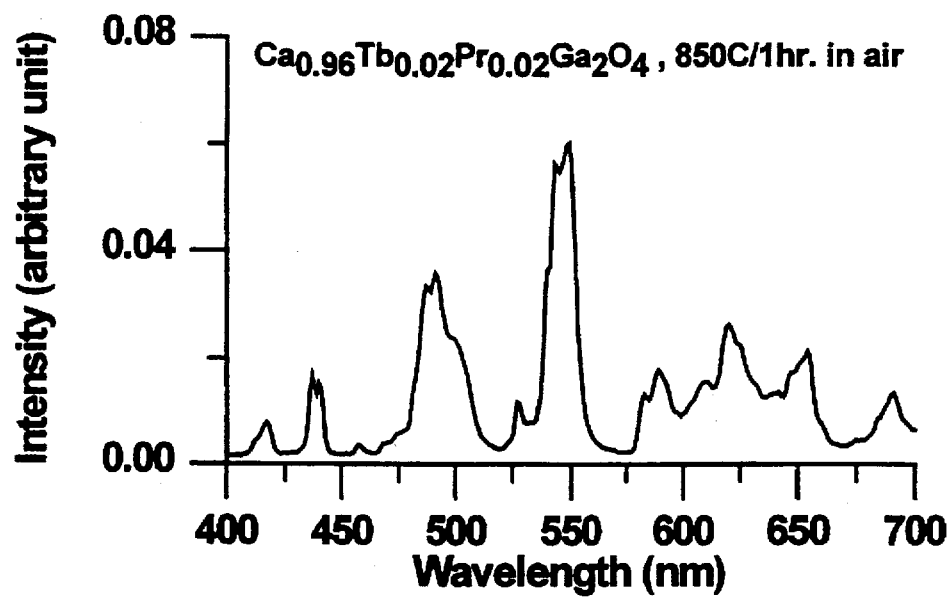
FIG. 15 shows the EL emission spectra for a phosphor film sputtered from $Ca_{0.96}Tb_{0.02}Pr_{0.02}Ga_2O_4$ onto an AVX substrate annealed as indicated.

The Tb and Pr doped materials were prepared with about 4% (Tb+Pr) and were sputtered in a mixture comprising Ar:$N_2$:$O_2$ in the ratio of 17:2:1 or Ar:$O_2$ in the ratio of 19:1. The EL emission spectrum for $Ca_{0.96}Tb_{0.02}Pr_{0.02}Ga_2O_4$ post-annealed at 850° C. for 1 hour in air is shown in FIG. 15.

Figure 16:
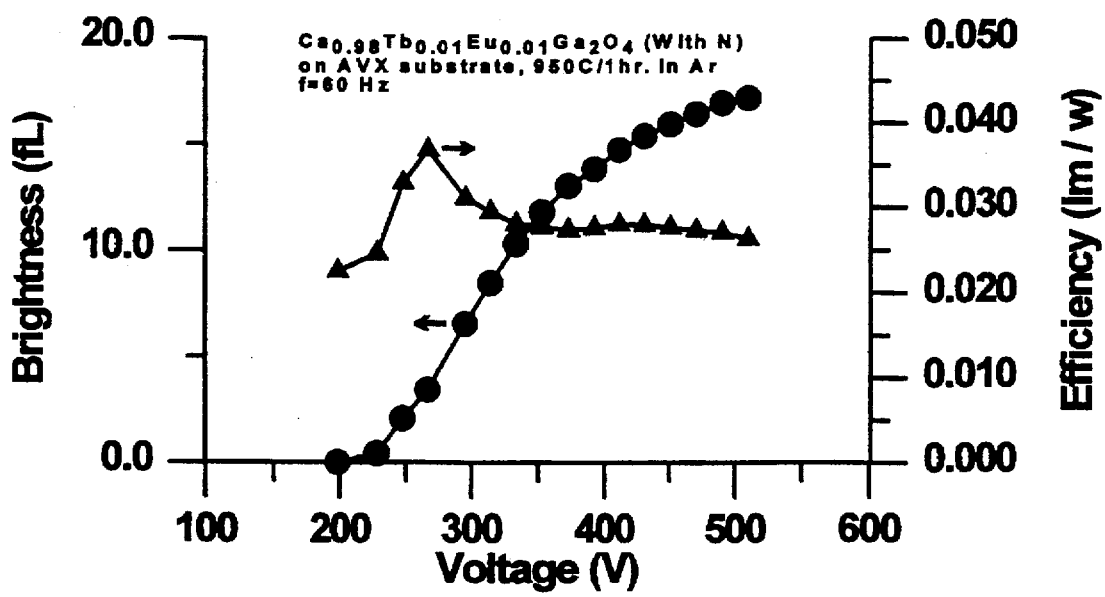
FIG. 16 is a plot of brightness and efficiency versus voltage at 60 Hz for an EL phosphor film sputtered from $Ca_{0.98}Tb_{0.01}Eu_{0.01}Ga_2O_4$ onto an AVX substrate annealed under the indicated condition.
Figure 17:
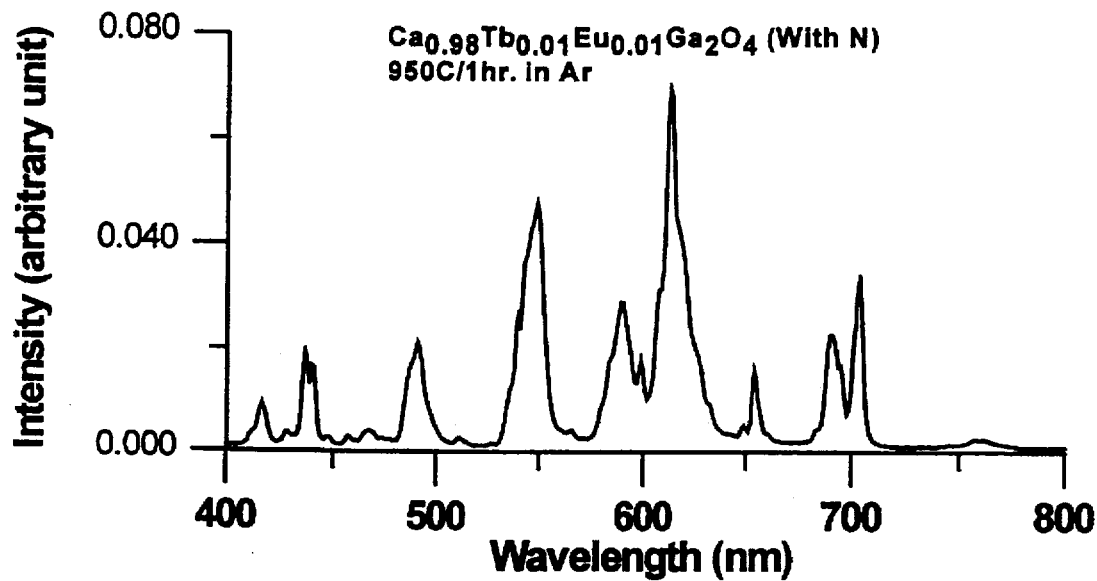
FIG. 17 shows the EL emission spectrum for the thin film of FIG. 16.

The Tb and Eu doped materials were prepared with about 2% (Tb+Eu) and were sputtered in a mixture comprising Ar:$N_2$:$O_2$ in the ratio of 17:2:1. The EL performance and emission spectrum for $Ca_{0.96}Tb_{0.01}Eu_{0.01}Ga_2O_4$ sputtered in 5% $O_2$, 10% $N_2$ and 85% Ar atmosphere and post-annealed at 950° C. for 1 hour in Ar are shown in FIGS. 16 and 17 respectively. It is to be noted that red, green and blue peaks appear in the spectrum so that this new material is considered a white phosphor.

2) $SrGa_2O_4$:RE Phosphors

Figure 18:
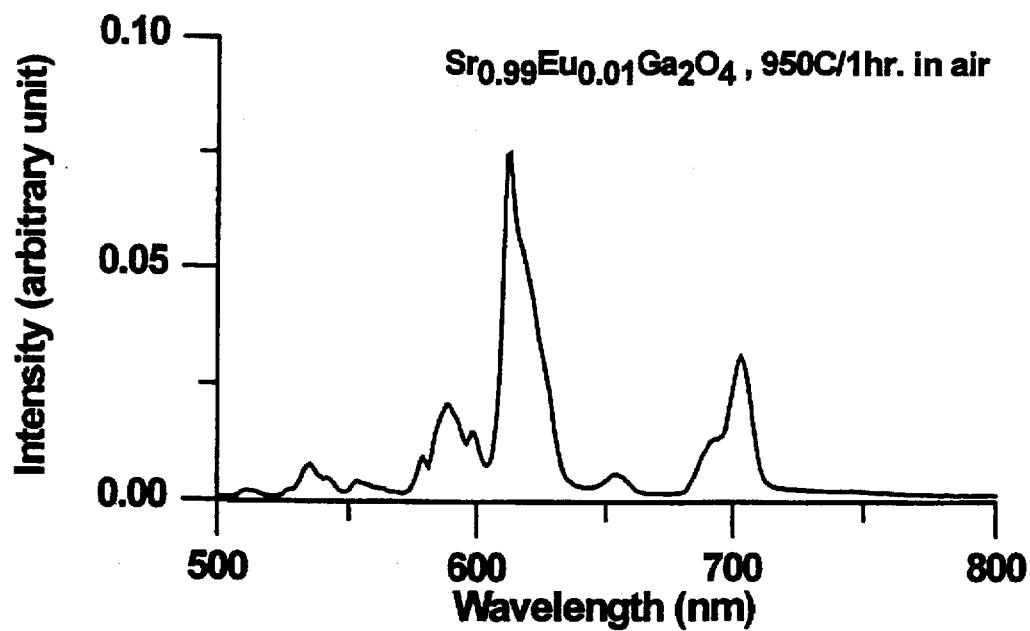
FIG. 18 shows the EL emission spectrum for an EL phosphor film sputtered from $Sr_{0.99}Eu_{0.01}Ga_2O_4$ under the indicated annealing condition.

The Eu doped materials were prepared with about 1% Eu and were sputtered in an Ar:$O_2$ mixture of 19:1. For $Sr_{0.99}Eu_{0.01}Ga_2O_4$ annealed at 950° C. for 1 hour in air the EL emission spectrum is shown in FIG. 18.

Figure 19:
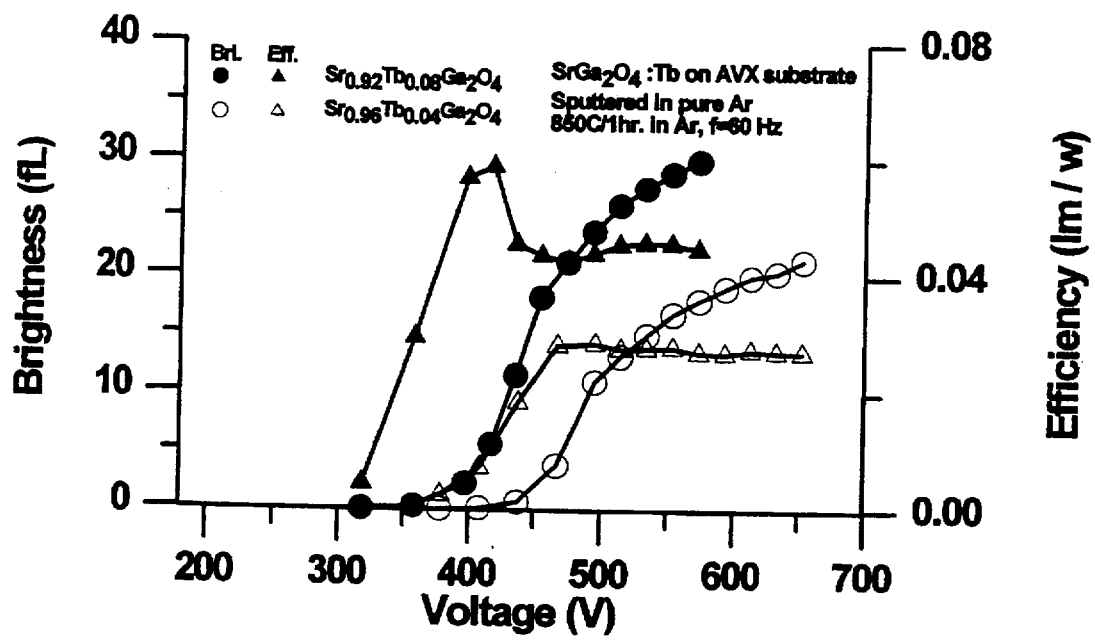
FIG. 19 is a plot of brightness and efficiency versus voltage at 60 Hz for EL phosphor films sputtered from $Sr_{0.92}Tb_{0.06}Ga_2O_4$ and $Sr_{0.96}Tb_{0.04}Ga_2O_4$ on AVX substrates annealed under the indicated conditions.
Figure 20:
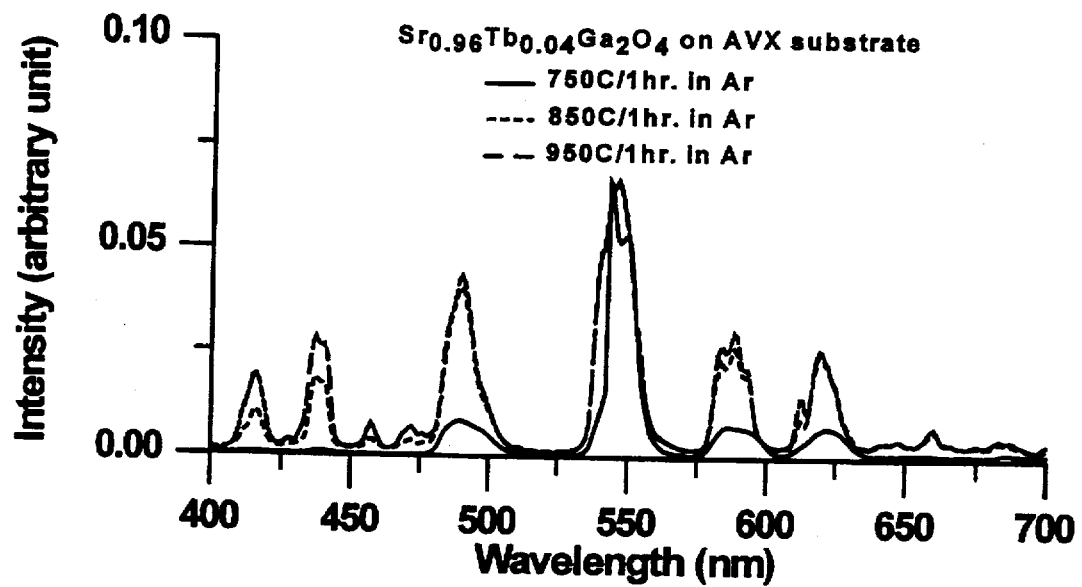
FIG. 20 shows the EL emission spectra for a phosphor film sputtered from $Sr_{0.96}Tb_{0.04}Ga_2O_4$ and annealed under the given conditions.

The Tb doped materials were prepared with about 2% to 12% Tb and were sputtered in pure argon (Ar). The brightness and efficiency data for $Sr_{0.92}Tb_{0.08}Ga_2O_4$ and $Sr_{0.96}Tb_{0.04}Ga_2O_4$ are shown in FIG. 19. The EL spectra for $Sr_{0.96}Tb_{0.04}Ga_2O_4$ post-annealed in Ar are shown in FIG. 20. It is worth noting that higher annealing temperature significantly enhances the emission peaks at 490 nm ($^5D_3 \rightarrow {}^7F_{1,0}$ and $^5D_4 \rightarrow {}^7F_6$ transitions), 438 nm ($^5D_3 \rightarrow {}^7F_4$ transition), 441 nm ($^5D_3 \rightarrow {}^7F_4$ transition) and 418 nm ($^5D_3 \rightarrow {}^7F_5$), which makes the overall emission colour look bluer as shown in FIG. 20.

Figure 21:
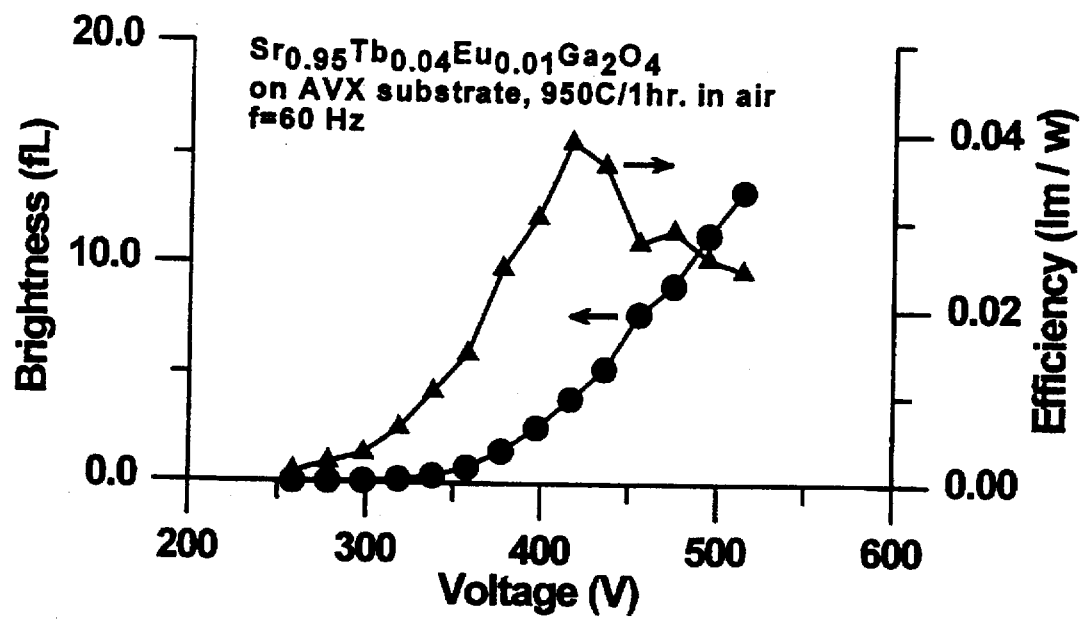
FIG. 21 is a plot of brightness and efficiency versus voltage at 60 Hz for an EL phosphor film sputtered from $Sr_{0.95}Tb_{0.04}Eu_{0.01}Ga_2O_4$ onto an AVX substrate annealed under the indicated condition.
Figure 22:
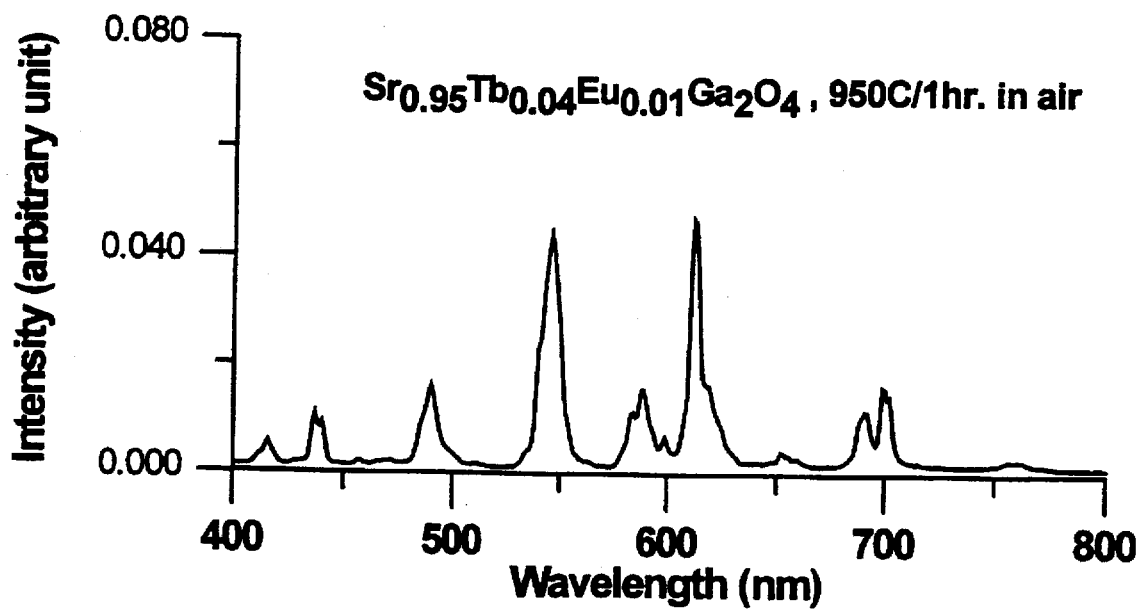
FIG. 22 shows the EL emission spectrum for the phosphor film of FIG. 21.

The Tb and Eu doped materials were prepared with about 5% (Eu+Tb) and were sputtered in an Ar:$O_2$ mixture of 19:1. The EL performance and emission spectrum for $Sr_{0.95}Tb_{0.04}Eu_{0.01}Ga_2O_4$ post-annealed at 950° C. for 1 hour in air are shown in FIGS. 21 and 22 respectively. It is to be noted that this provides a white phosphor containing red, green and blue peaks.

3) $BaGa_2O_4$:RE Phosphors

Figure 23:
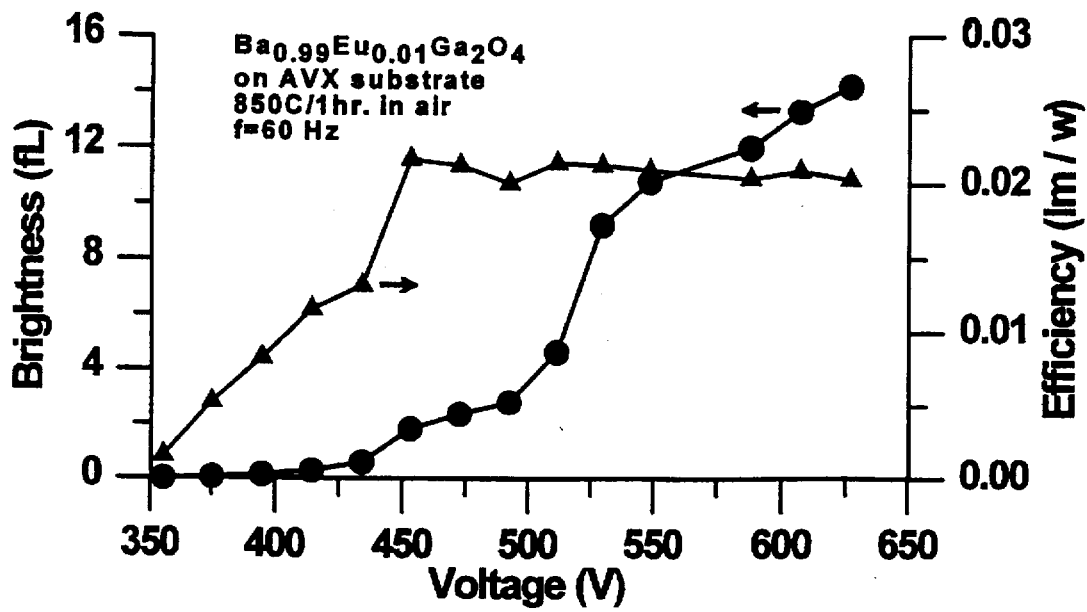
FIG. 23 is a plot of brightness and efficiency versus voltage at 60 Hz for an EL phosphor film sputtered from $Ba_{0.99}Eu_{0.01}Ga_2O_4$ onto an AVX substrate annealed under the indicated condition.
Figure 24:
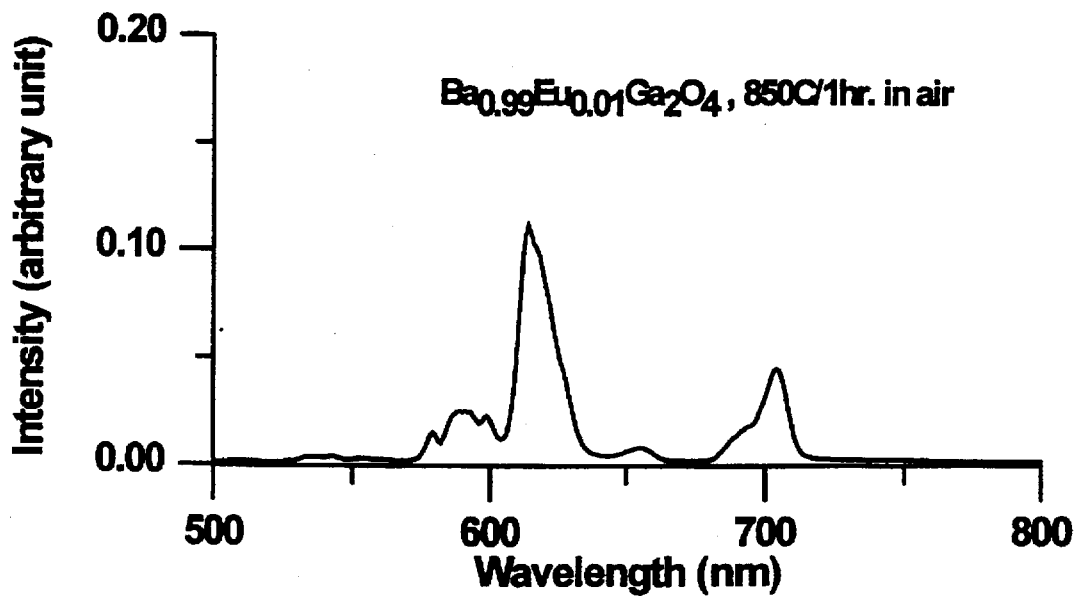
FIG. 24 shows the EL emission spectrum for the phosphor film of FIG. 23.

The films were produced by sputtering in an Ar:$O_2$ mixture of 19:1 and annealing in the range of 700° C. to 950° C. in air. The EL performance at 60 Hz for $Ba_{0.99}Eu_{0.01}Ga_2O_4$ post-annealed at 850° C. for 1 hour is shown in FIG. 23. The corresponding EL emission spectrum is shown in FIG. 24.

Figure 25:
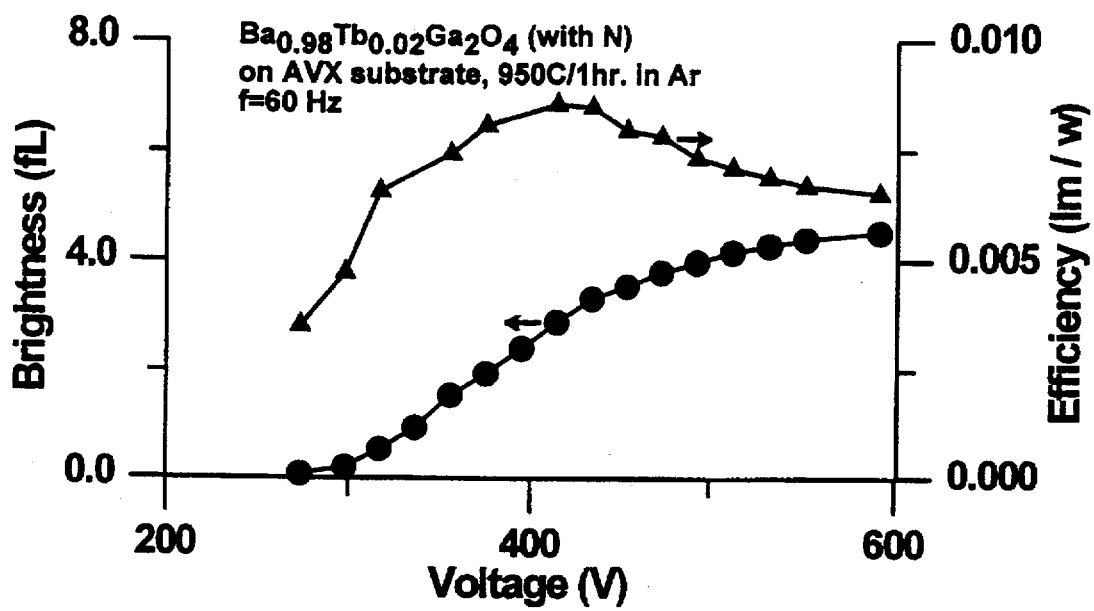
FIG. 25 is a plot of brightness and efficiency versus voltage at 60 Hz for an EL phosphor film sputtered from $Ba_{0.98}Tb_{0.02}Ga_2O_4$ onto an AVX substrate annealed under the indicated condition.
Figure 26:
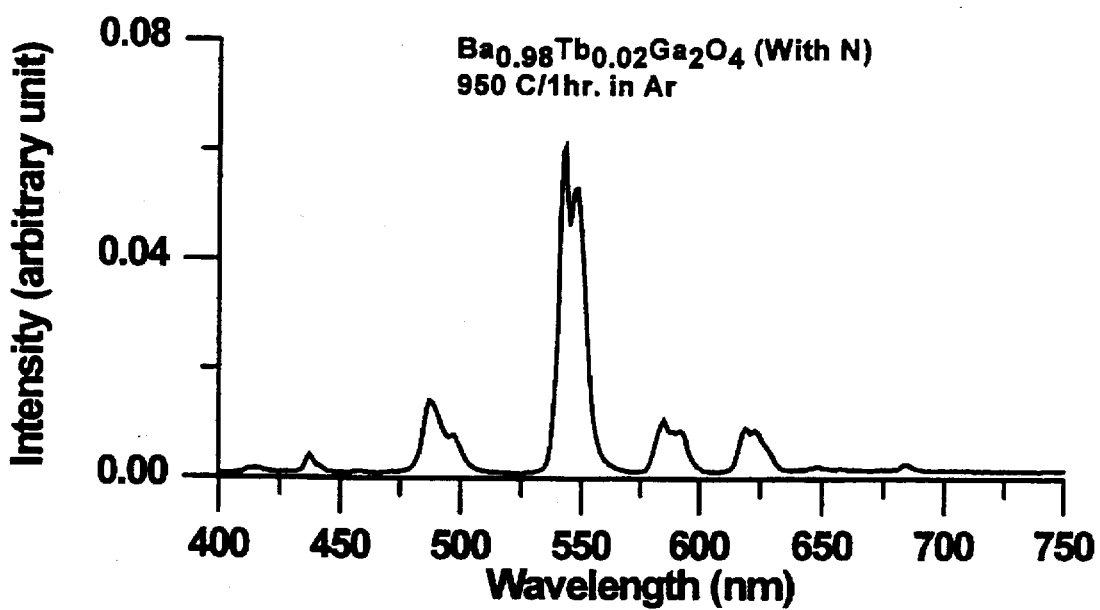
FIG. 26 shows the EL emission spectrum for the thin film of FIG. 25.

The EL performance and emission spectrum for $Ba_{0.96}Tb_{0.02}Ga_2O_4$ sputtered in 5% $O_2$, 5% $N_2$ and 90% Ar atmosphere and post-annealed at 950° C. for 1 hour in Ar are shown in FIGS. 25 and 26 respectively.

4) $Ca_3Ga_2O_6$:RE Phosphors

Figure 27:
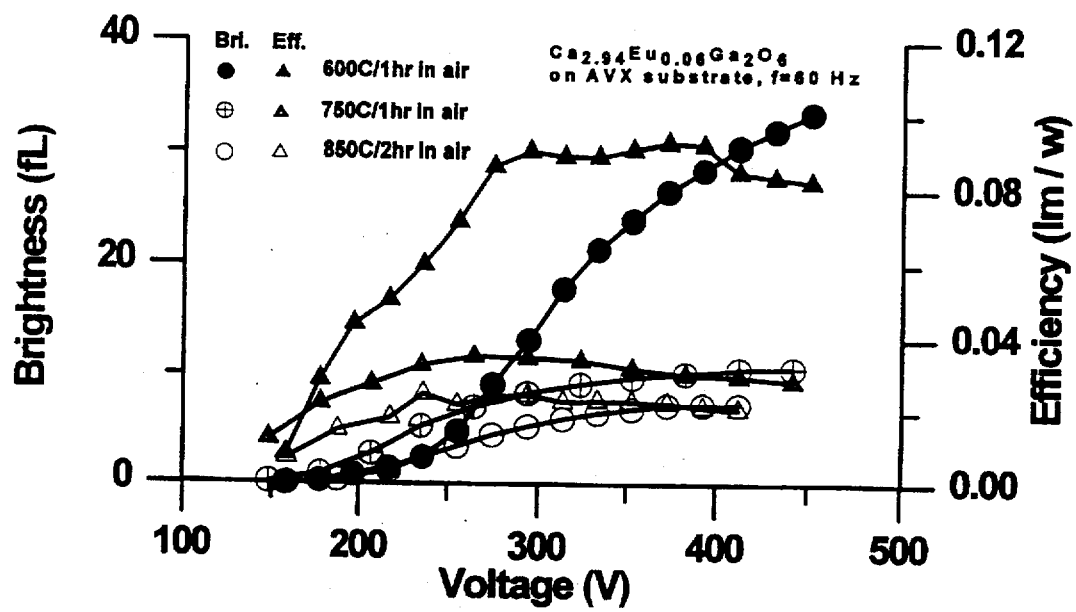
FIG. 27 is a plot of brightness and efficiency versus voltage at 60 Hz for EL phosphor films sputtered from $Ca_{2.94}Eu_{0.06}Ga_2O_6$ onto AVX substrates and annealed under the indicated conditions.
Figure 28:
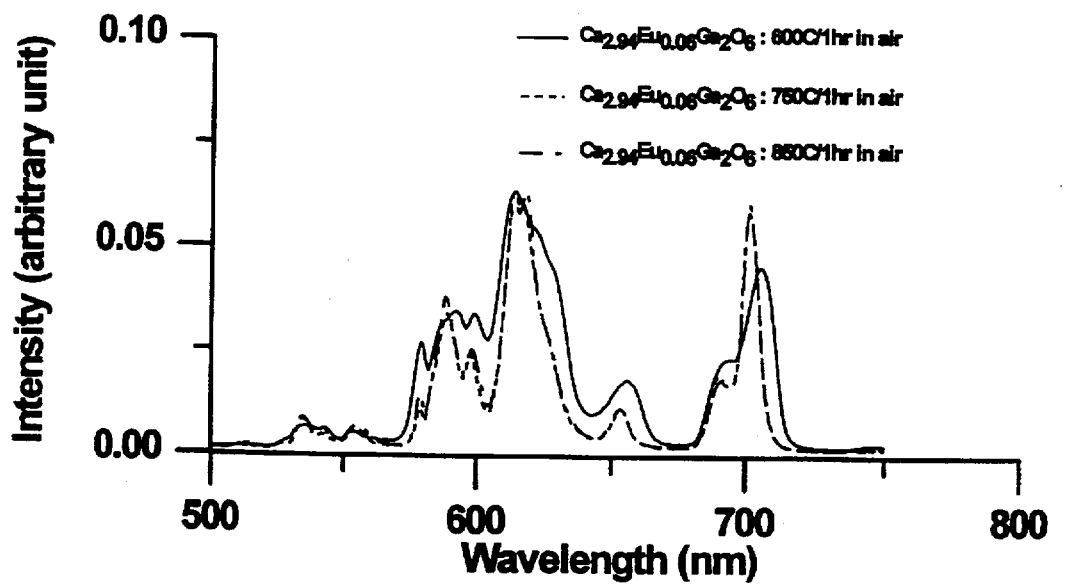
FIG. 28 shows the EL emission spectra for the phosphor films of FIG. 27.

The Eu doped materials were prepared with about 2% Eu and were sputtered in an Ar:$O_2$ mixture of 19:1. The EL performances at 60 Hz for $Ca_{2.94}Eu_{0.06}Ga_2O_6$ post-annealed at 600° C., 750° C. and 850° C. for 1 hour in air are shown in FIG. 27. The corresponding EL emission spectra are shown in FIG. 28. It is worth noting that the EL performance is the best for the amorphous $Ca_{2.94}Eu_{0.06}Ga_2O_6$ thin film, which is annealed at 600° C. in air for one hour.

The Tb doped materials were prepared about 2% Tb and were sputtered in an Ar:$O_2$ mixture of 19:1. The EL of $Ca_{2.94}Tb_{0.06}Ga_2O_6$ was weak with a maximum brightness of 3 fL. at 60 Hz.

5) $CaGa_4O_7$:RE Phosphors

Figure 29:
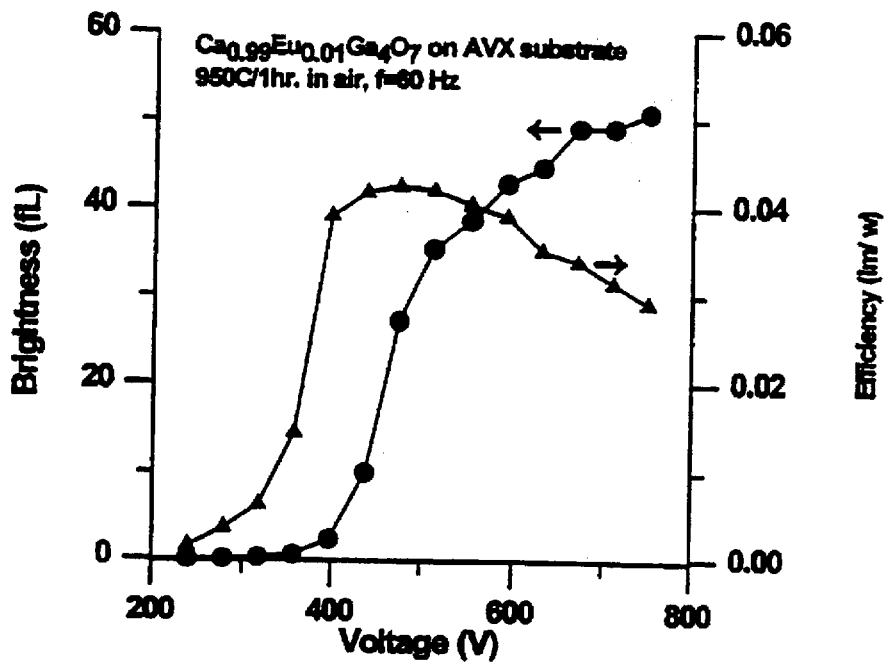
FIG. 29 is a plot of brightness and efficiency versus voltage at 60 Hz for an EL phosphor film sputtered from $Ca_{0.99}Eu_{0.01}Ga_4O_7$ onto an AVX substrate and annealed under the indicated condition.
Figure 30:
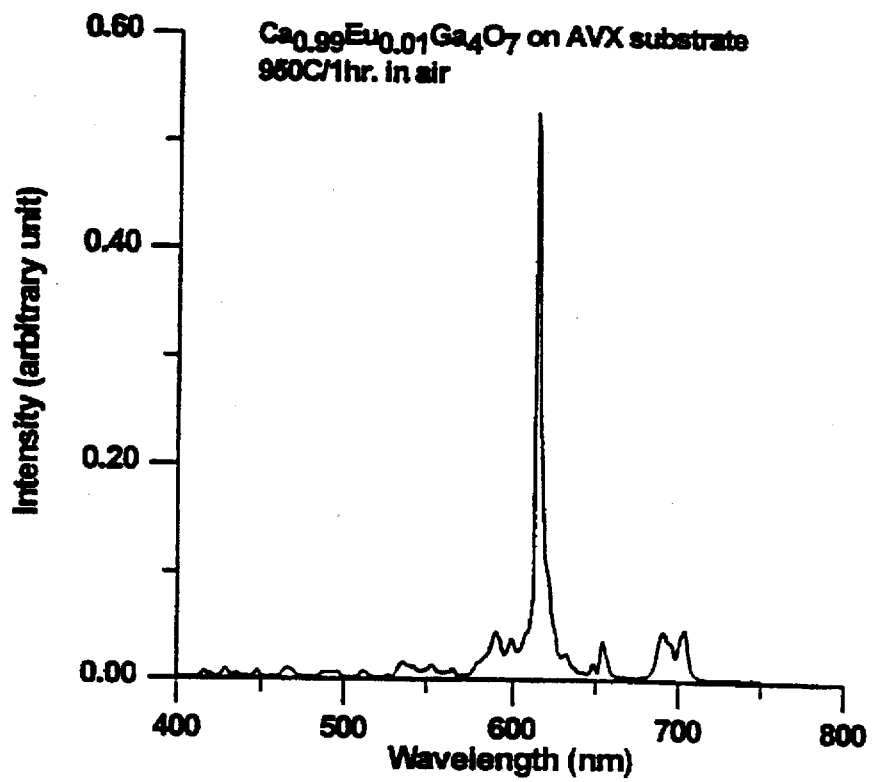
FIG. 30 shows the EL emission spectrum for the phosphor film of FIG. 29.

The Eu doped materials were prepared with about 1% Eu and were sputtered in an Ar:$O_2$ mixture of 9:1. The EL performance at 60 Hz for the specified $Ca_{0.99}Eu_{0.01}Ga_4O_7$ film sputtered in 10% $O_2$—90% Ar and post-annealed at 950° C. for 1 hour in air is shown in FIG. 29 and the EL emission spectrum is shown in FIG. 30.

Figure 31:
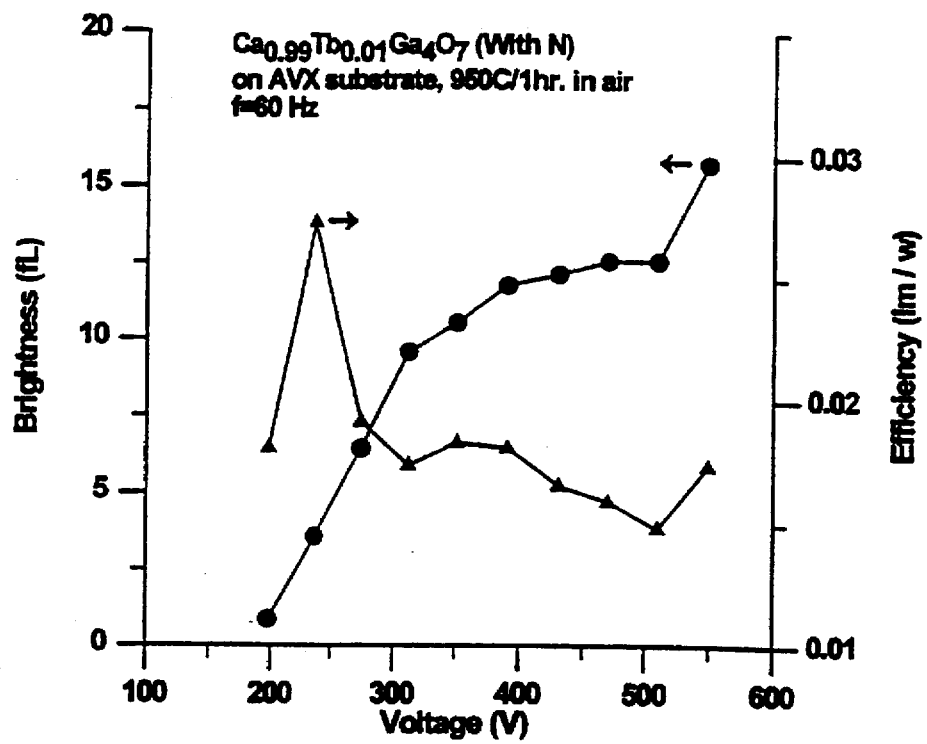
FIG. 31 is a plot of brightness and efficiency versus voltage at 60 Hz for an EL phosphor film sputtered from $Ca_{0.99}Tb_{0.01}Ga_4O_7$ onto an AVX substrate and annealed under the indicated condition.
Figure 32:
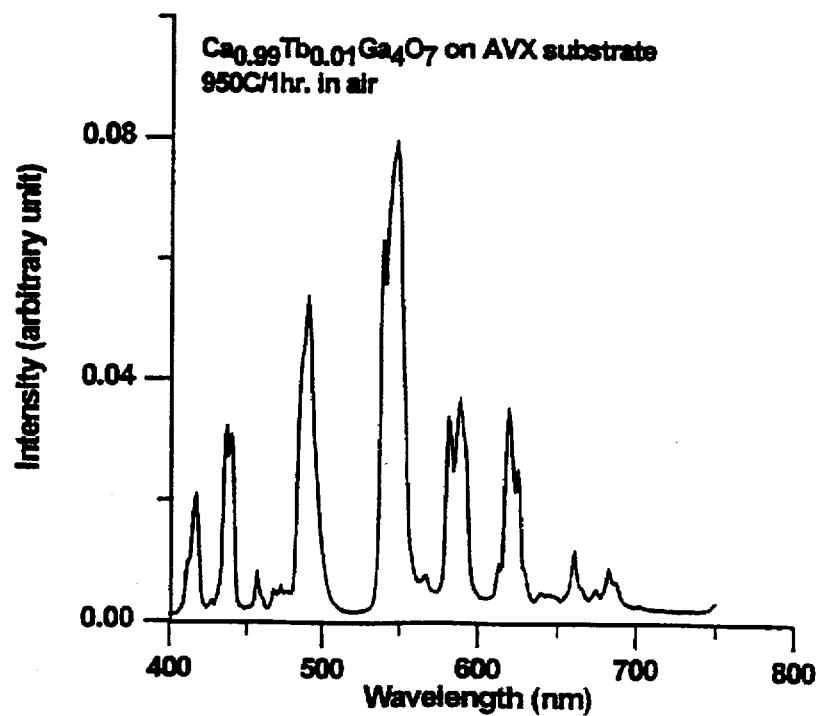
FIG. 32 shows the EL emission spectrum for the phosphor film of FIG. 31.

The Tb doped materials were prepared with about 1% Tb. The EL performance and emission spectrum for the specified $Ca_{0.99}Tb_{0.01}Ga_4O_7$ film sputtered in 5% $N_2$—10% $O_2$—85% Ar and post-annealed at 950° C. for 1 hour in air are shown in FIGS. 31 and 32, respectively.

Figure 33:
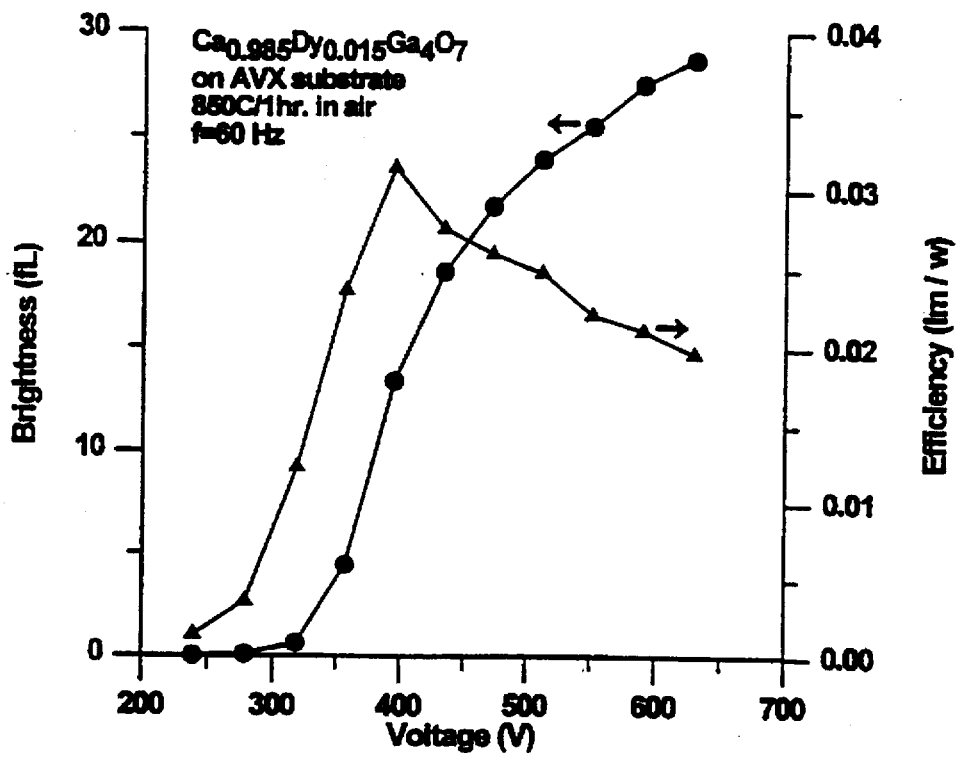
FIG. 33 is a plot of brightness and efficiency versus voltage at 60 Hz for an EL phosphor film sputtered from $Ca_{0.985}Dy_{0.015}Ga_4O_7$ onto an AVX substrate and annealed under the indicated condition.
Figure 34:
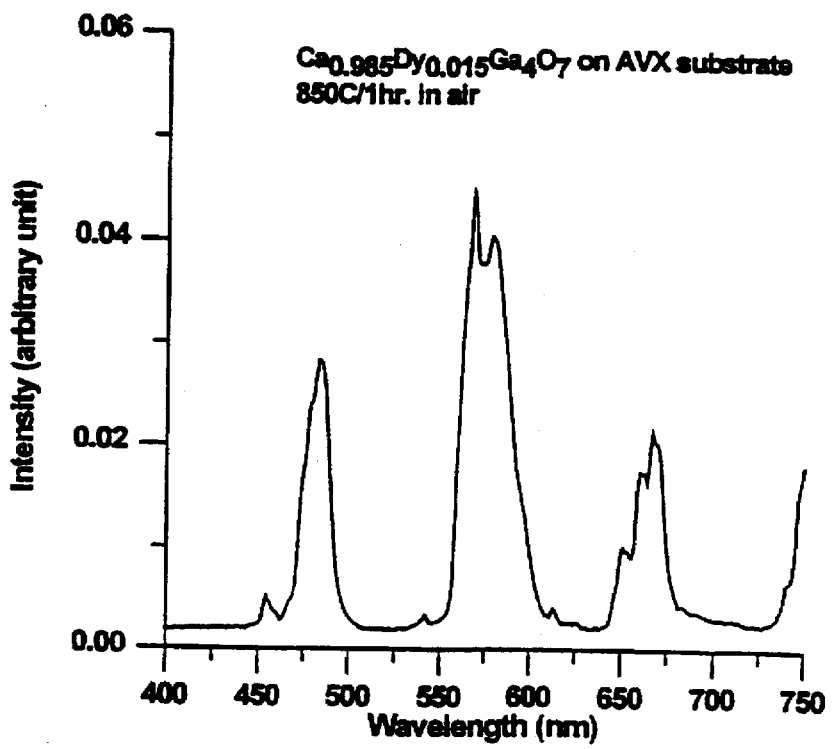
FIG. 34 shows the EL emission spectrum for the phosphor film of FIG. 33.

The Dy doped materials were prepared with about 1.5% Dy and were sputtered in an Ar:$O_2$ mixture of 9:1. The EL performance and emission spectrum for the $Ca_{0.985}Dy_{0.015}Ga_4O_7$ film sputtered in 10% $O_2$—90% Ar and post-annealed at 850° C. in air are shown in FIGS. 33 and 34, respectively.

6) $Sr_3Ga_4O_9$:Tb Phosphors

Figure 35:
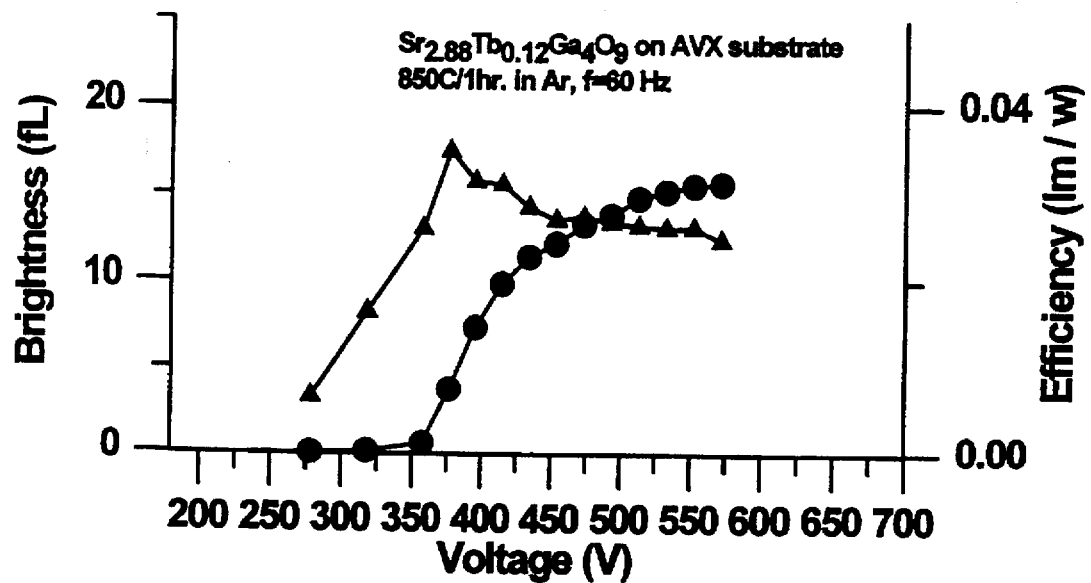
FIG. 35 is a plot of brightness and efficiency versus voltage at 60 Hz for an EL phosphor film sputtered from $Sr_{2.68}T_{0.12}Ga_4O_9$ and annealed under the given condition.
Figure 36:
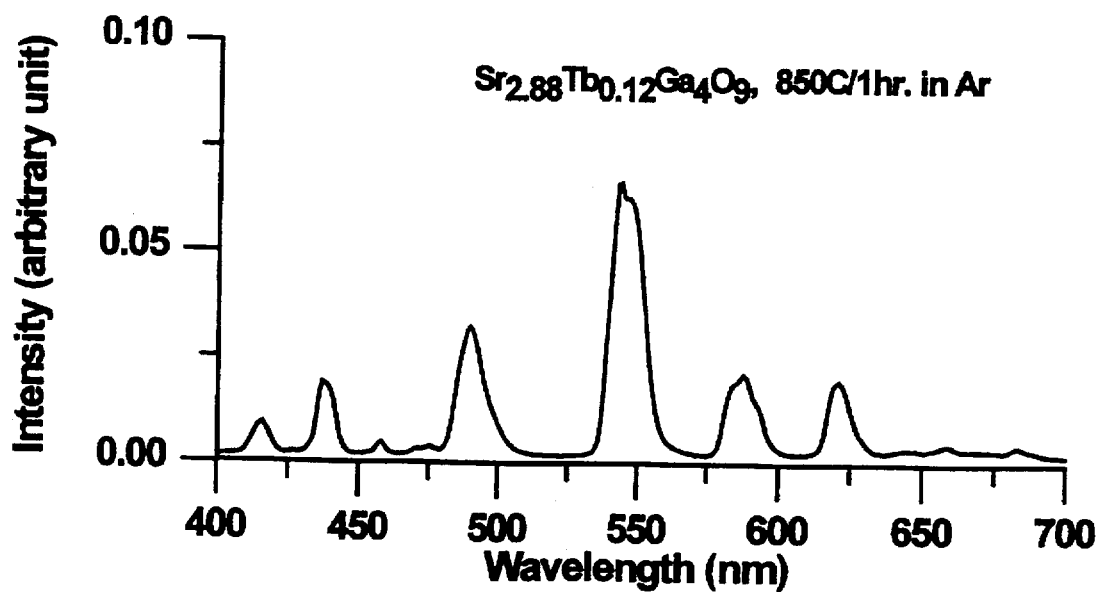
FIG. 36 shows the EL emission spectrum of the phosphor film of FIG. 35.

The Tb doped materials were prepared with about 4% Tb and were sputtered in Ar. The EL performance for the $Sr_{2.88}Tb_{0.12}Ga_4O_9$ film sputtered in pure Ar and post-annealed at 850° C. for 1 hour in Ar is shown in FIG. 35. Thus, $Sr_{2.88}Tb_{0.12}Ga_4O_9$ is quite efficient as an EL material. It is also quite notable that this material exhibits significant EL behavior as deposited without post fabrication annealing (19 fL at 60 Hz, data not shown). The EL emission spectrum for the film is shown in FIG. 36.

Phase confirmation by X-ray diffraction

Figure 37:
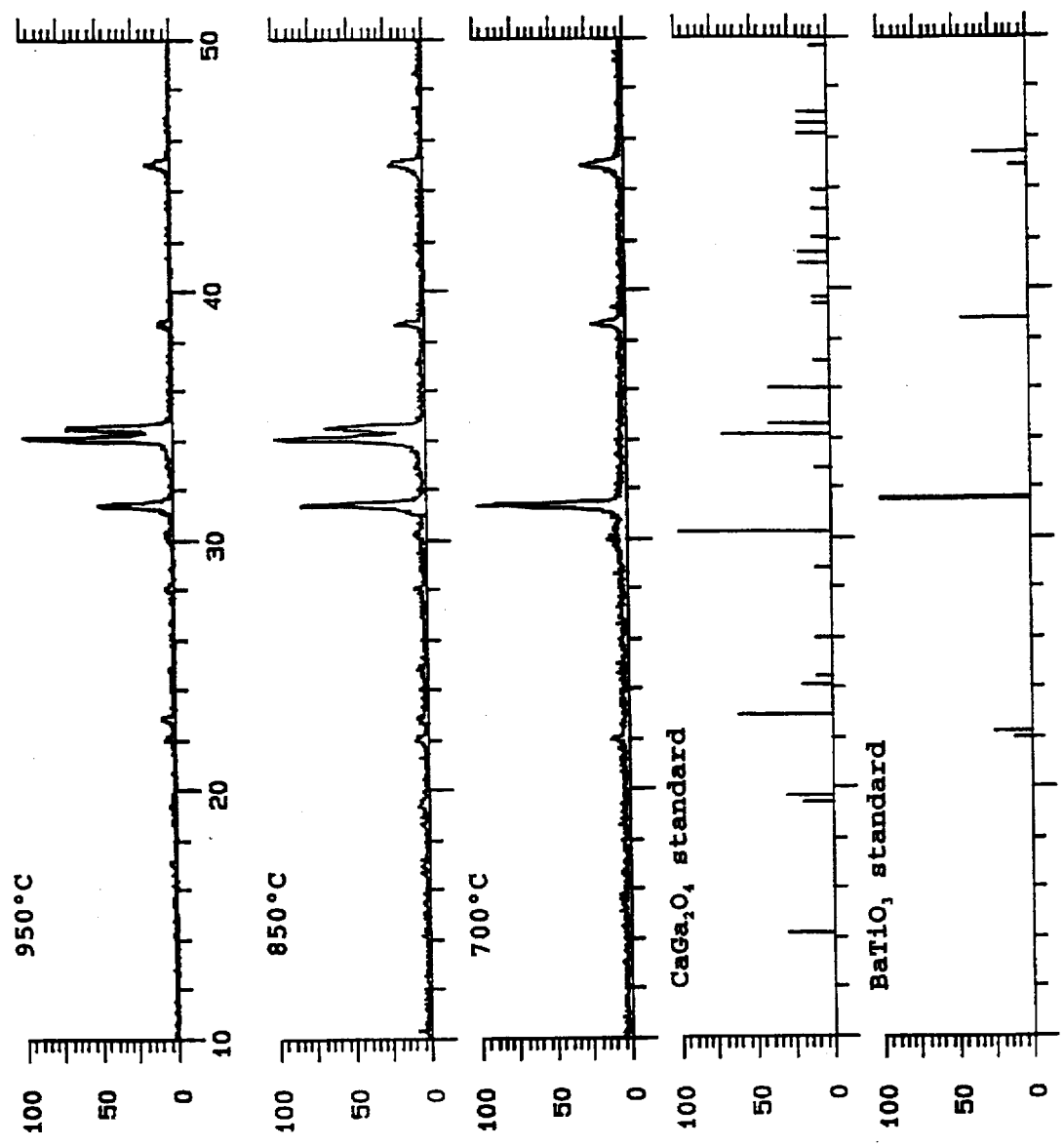
FIG. 37 compares the x-ray diffraction patterns for EL phosphor films sputtered from $Ca_{0.99}Eu_{0.01}Ga_2O_4$ onto AVX substrates and annealed at 700° C., 850° C. and 950° C. for 1 hour.
Figure 38:
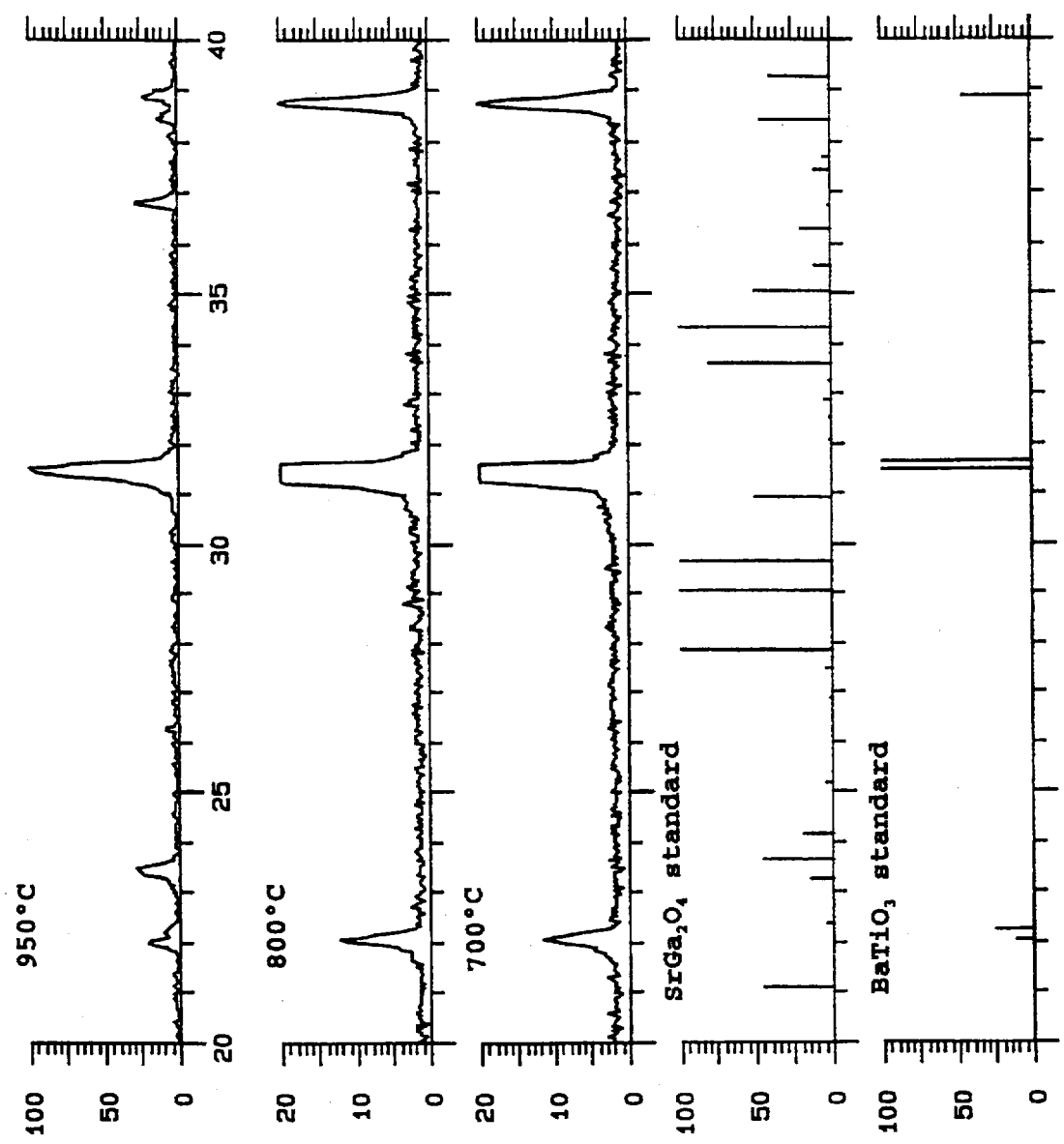
FIG. 38 compares the x-ray diffraction patterns for thin films sputtered from $Sr_{0.99}Eu_{0.01}Ga_2O_4$ onto $BaTiO_3$ and annealed at 700° C., 800° C. and 950° C. for 1 hour.
Figure 39:
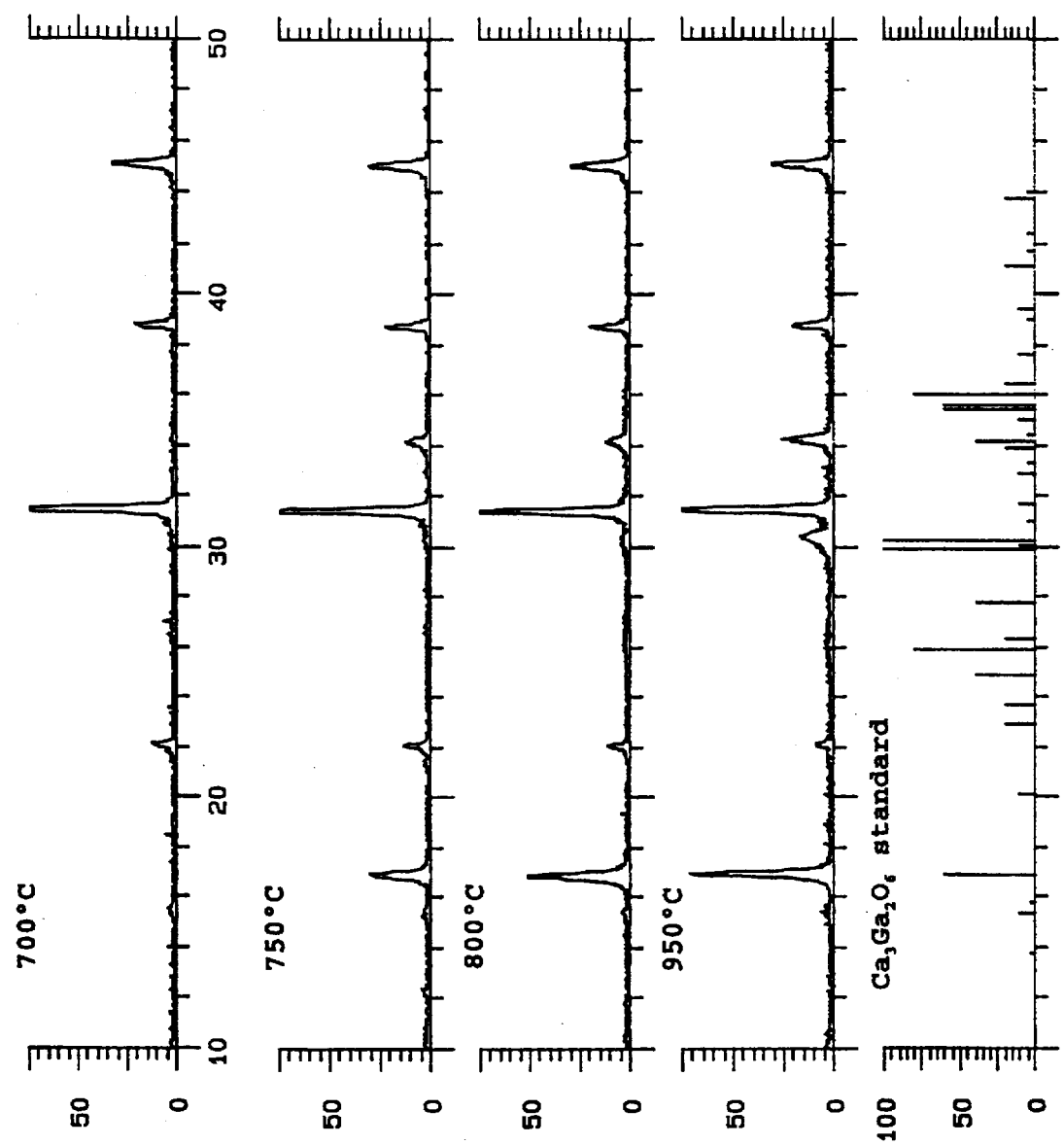
FIG. 39 compares the x-ray diffraction patterns for thin films sputtered from $Ca_{2.94}Eu_{0.06}Ga_2O_8$ onto AVX substrates and annealed at 700° C., 750° C., 800° C. and 950° C. for 1 hour.
Figure 40:
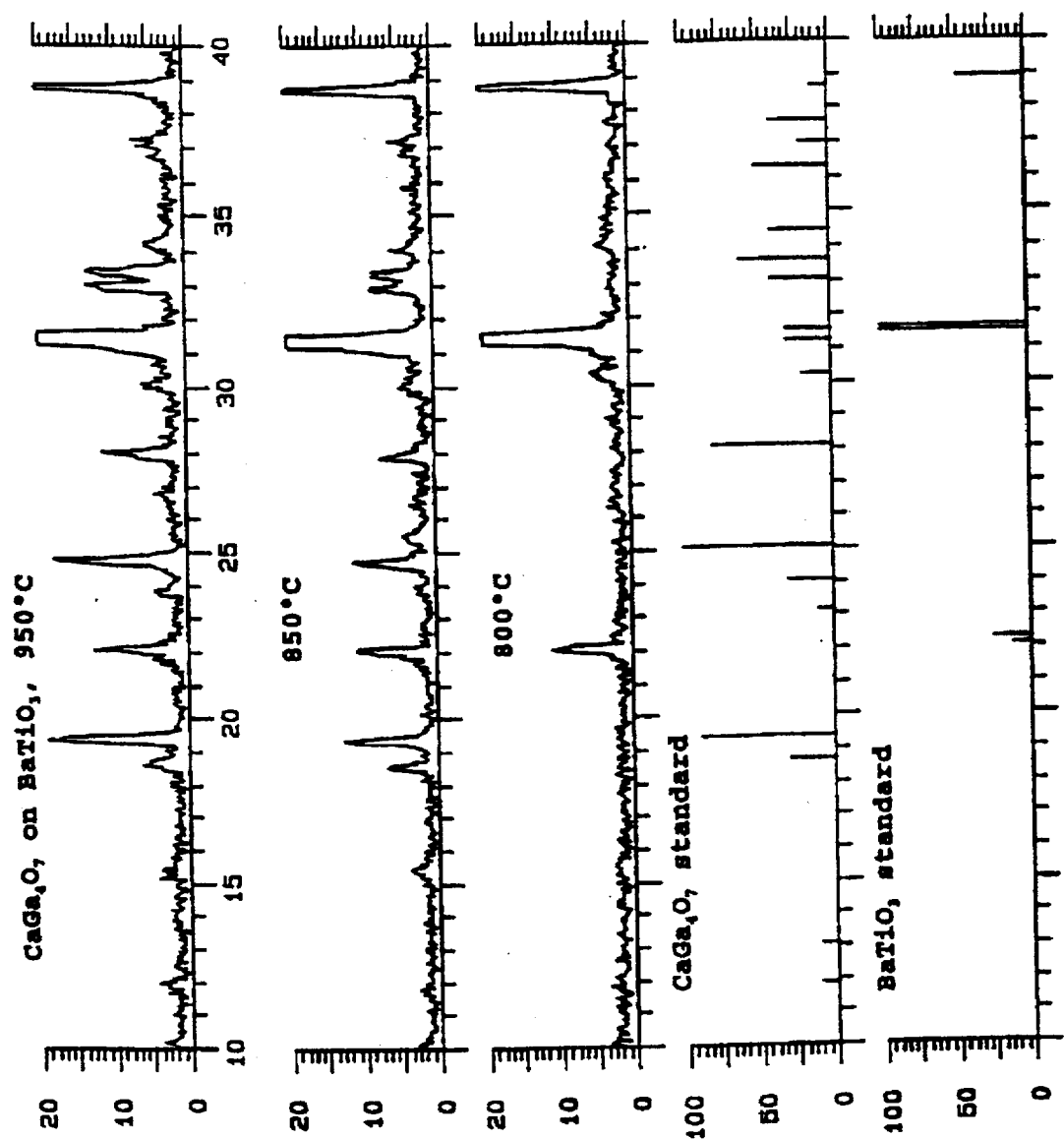
FIG. 40 compares the x-ray diffraction patterns for films sputtered from $Ca_{0.99}Eu_{0.01}Ga_4O_7$ onto AVX substrates and annealed at various temperatures for 1 hour, indicating the crystallization temperature for the compound is between 800° C. and 850° C.

The x-ray diffraction patterns for $Ca_{0.99}Eu_{0.01}Ga_2O_4$ thin films grown on AVX substrate and annealed at 700° C., 850° C. and 950° C. for 1 hour are shown in FIG. 37. The patterns suggest that $CaGa_2O_4$:Eu thin film is well-crystallized in orthorhombic form when annealed at above 850° C. The x-ray diffraction patterns for the $SrGa_2O_4$ thin films grown on $BaTiO_3$ and annealed at 700° C., 800° C. and 950° C. for 1 hour are shown in FIG. 38, which confirms that the $SrGa_2O_4$ thin film is crystallized when annealed at 950° C. but exhibits a strong preferred orientation. The x-ray diffraction patterns for $Ca_3Ga_2O_6$ thin films annealed at various temperatures are shown in FIG. 39, indicating the crystallization temperature for the compound is between 700° C. and 750° C. FIG. 40 shows the x-ray diffraction patterns for $CaGa_4O_7$ thin films annealed at various temperatures, indicating the crystallization temperature for the compound is between 800° C. and 850° C.

C) NEW $Zn_2Si_xGe_{1-x}O_4$:Mn PHOSPHORS EXHIBITING ELECTROLUMINESCENCE BEHAVIOUR

Film Preparation

Sylvania phosphor 2282 which is a powder of $Zn_2SiO_4$:Mn was mixed with 99.998% pure $GeO_2$ powder, 99.9% pure ZnO powder and 99.9% pure MnO powder in a ratio appropriate for $Zn_{1.96}Mn_{0.04}Si_{0.5}Ge_{0.5}O_4$. The mixed powder was ground together using a mortar and pestle and placed in a 2 inch RF magnetron gun (US gun). The films were deposited by sputtering from the powder mixture. A ceramic dielectric substrate (also referred to herein as the Sherritt substrate, described in P. Bailey, D. Carkner and X. Wu, SID'95 Digest, p. 484; and U.S. Pat. No. 5,432,015) was placed 4 cm above the gun and sputtering was carried out in a 5–10 mtorr atmosphere of 5–20% $O_2$ in argon for about 1 hour. The substrate temperature was about 240° C. and sputtering power was 100 watts. The samples were then either annealed in vacuum or in air at between 650° C. and 700° C. for 1 hour or not annealed. For EL measurements, an indium tin oxide layer was subsequently sputter deposited onto the surface of the film.

Results

Figure 41:
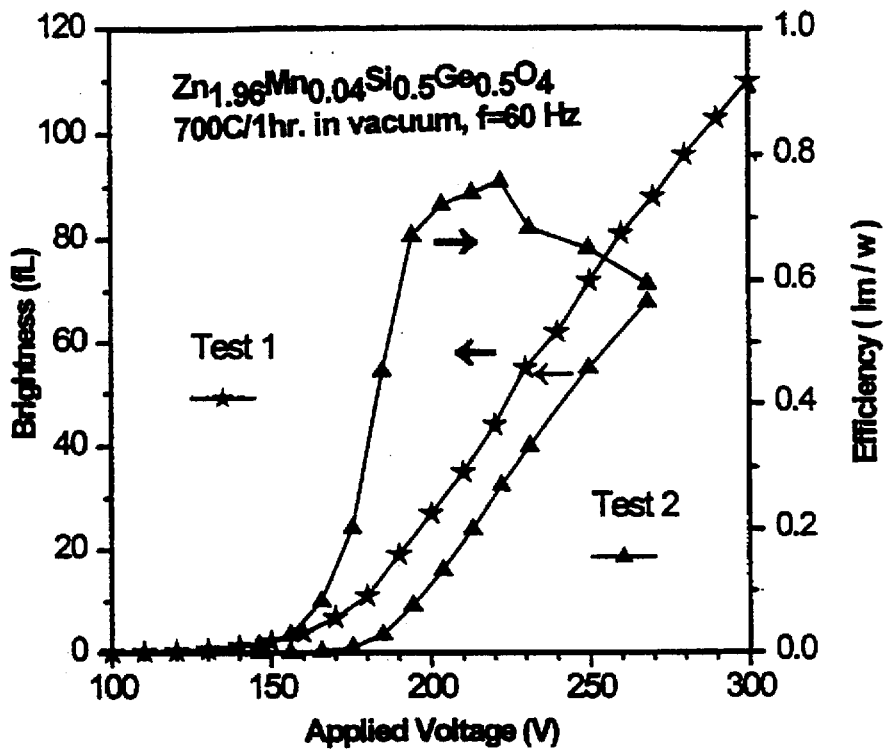
FIG. 41 is a plot of brightness and efficiency versus applied voltage at 60 Hz for a green emitting EL phosphor film sputtered from $Zn_{1.96}Mn_{0.04}Si_{0.5}Ge_{0.5}O_4$ onto a Sherritt substrate and annealed under the given condition.
Figure 42:
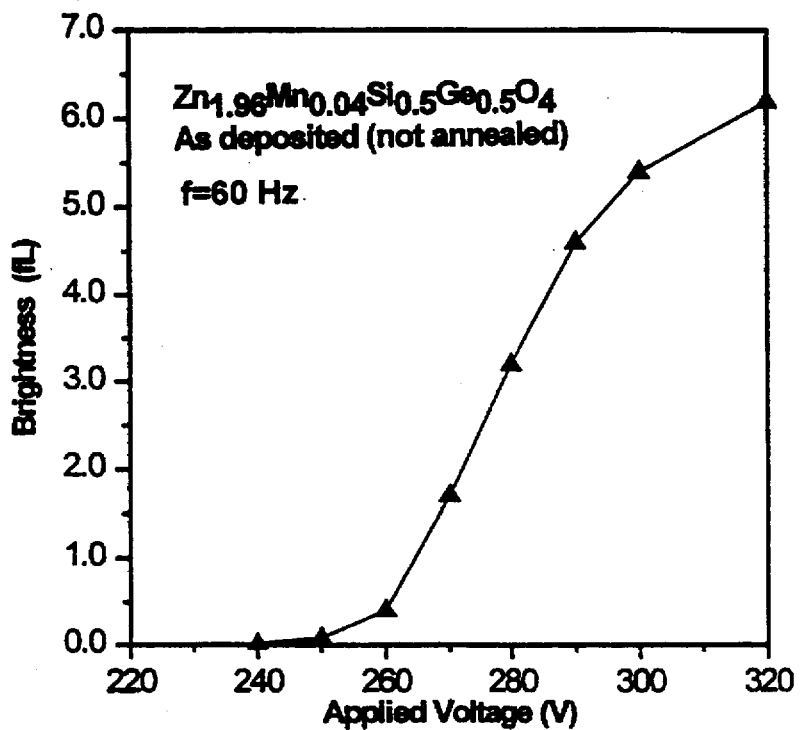
FIG. 42 is a plot of brightness versus applied voltage at 60 Hz for a red emitting EL phosphor film sputtered from $Zn_{1.96}Mn_{0.04}Si_{0.5}Ge_{0.5}O_4$ with no annealing.
Figure 43:
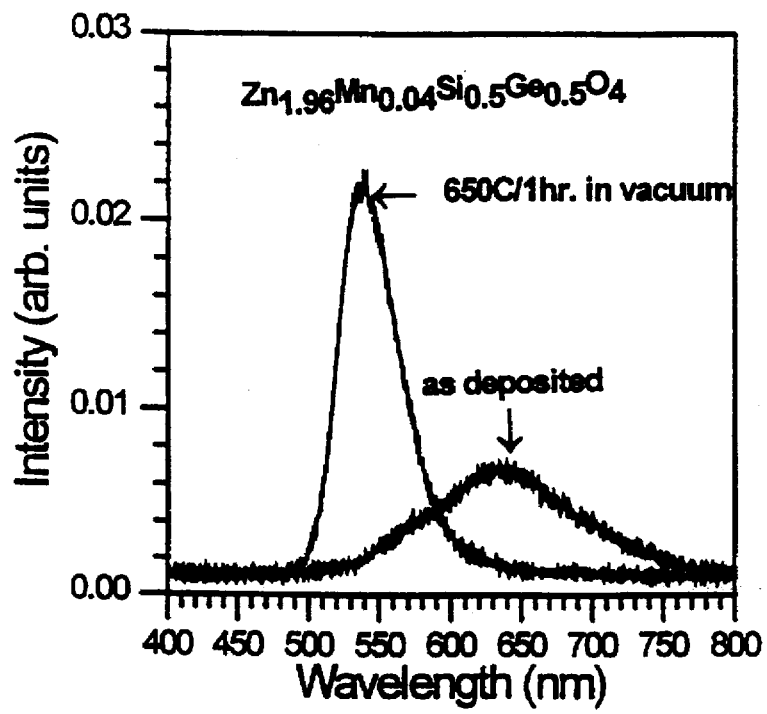
FIG. 43 compares the emission spectra of two EL films sputtered from $Zn_{1.96}Mn_{0.04}Si_{0.5}Ge_{0.5}O_4$, one of the films being annealed and the other not annealed.

The completed device is similar to that shown in FIG. 1, except that the composition of the ceramic layers 12 and 16 (FIG. 1) is not $BaTiO_3$ in the case of Sherritt substrates. Electroluminescence was observed and FIG. 41 shows the characteristic brightness and efficiency data of a green-emitting $Zn_{1.96}Mn_{0.04}Si_{0.5}Ge_{0.5}O_4$ EL device, and FIG. 42 shows the data of a red-emitting EL device. The red-emitting phosphor is amorphous by x-ray diffraction and is stable in air up to 600° C. The emission spectra are shown in FIG. 43.

These results are commercially very useful as brightnesses of 50 cd/m$^2$ (or 15 fL) or more are useful for flat panel displays. These brightnesses compare favourably with brightnesses obtained in the best ZnS green electroluminescent devices reported to date as disclosed in H. Ohnishi, SID'94 Digest, p. 129, 1994.

Figure 44:
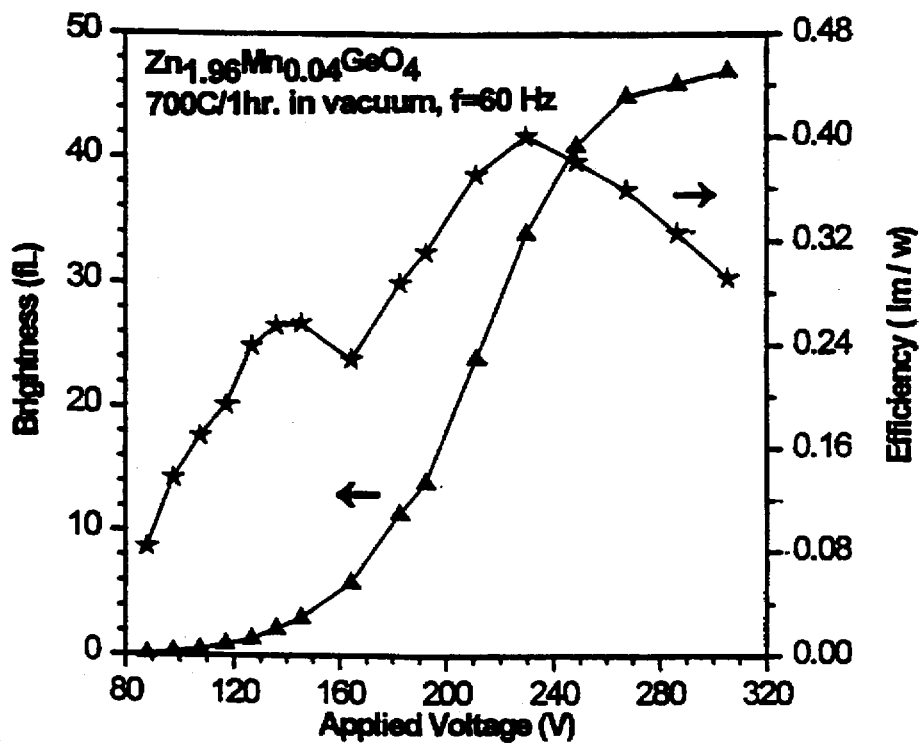
FIG. 44 is a plot of brightness and EL efficiency versus applied voltage at 60 Hz for an EL phosphor film sputtered from $Zn_{1.96}Mn_{0.04}GeO_4$ onto a Sherritt substrate and annealed under the indicated condition.
Figure 45:
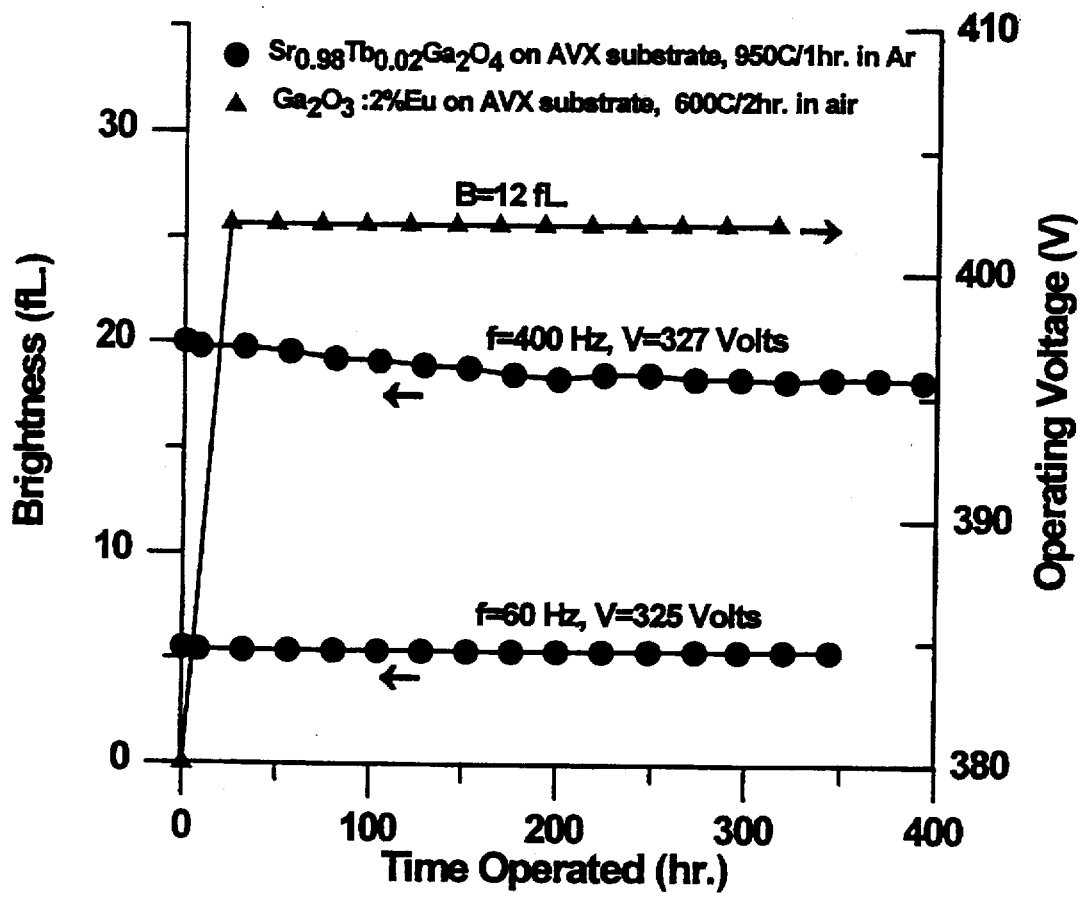
FIG. 45 is a plot of operating voltage necessary to maintain a brightness of 12 fL in $Ga_2O_3$:2%Eu as a function of time, and the brightness as a function of operating time at 60 Hz and 400 Hz drive for an EL phosphor film sputtered from $Sr_{0.96}Tb_{0.002}Ga_2O_4$ onto an AVX substrate with fixed voltages as shown.

Devices were also made on Sherritt substrates using $Zn_2GeO_4$:Mn with the same procedures. The Mn doped materials were prepared with between about 1% to 6% Mn and were sputtered in a gas mixture comprising Ar with $O_2$ in the range of between 5 to 20% onto substrates heated to between 200° C. to 600° C. The films were annealed in either vacuum or air. Typical brightness and efficiency data are shown in FIG. 44 for a 2% Mn doping. The brightness and efficiency values are smaller than those of the mixed Si—Ge compounds. Annealing temperatures were also 700° C., but could be dropped to 650° C. for $Zn_2GeO_4$:Mn if a longer annealing time was used.

It is to be understood that the nomenclature or notation used herein to identify the new phoshor materials is not to be interpreted as limiting in any way. For example, the percentage doping notation has been used in association with the doped gallium oxide compounds since it is not necessarily the case that the rare earth dopants substitute for gallium in the host lattice, while in other compounds the inventors believe substitution occurs and the stoichiometric formulas have been used.

It will also be understood by those skilled in the art that the allowable ranges of concentration of dopants in the different new phoshpor materials disclosed herein will depend on the solubility limit of the dopant in the oxides, For example, a series of five targets comprising $SrGa_2O_4$:n%Tb were prepared in which n % was 2%, 4%, 8%, 12% and 16%. Films were prepared by sputtering from these targets and annealed as disclosed above. The sputtered films with dopant levels up to 12% were observed to be homogeneous, single phase films exhibiting EL behaviour while film sputtered from the target with 16% Tb was inhomogeneous with clearly visible precipitates which did not exhibit EL behaviour. Hence in this case a solubility limit of about 15% Tb in the host gallium oxide lattice is estimated. The inventors reasonably contemplate that EL behavior is exhibited in all new phosphors disclosed herein in the range of dopant concentration corresponding to the solubility range of the dopant(s) in the host.

Those skilled in the art will understand that the EL characteristics of the phosphors may vary within the solubility range of the dopant(s) in the host lattice. Electronic interactions between dopant ions may determine the preferred concentration of dopant ions for maximum brightness and efficiency. This phenomenon, known as concentration quenching, results in decreasing brightness and efficiency for doping concentrations so that within the solubility limit there will be preferred dopant concentrations which give optimum EL properties.

In the case when the dopant in a host lattice comprises more than one element, the criteria for doping ranges involve the above considerations as well as the possibility of energy transfer between dopants of different chemical elements. Notwithstanding this, however, it will be understood by those skilled in the art that more than one chemically distinct dopant element may be simultaneously introduced into a host lattice that EL may be obtained from each distinct dopant simultaneously so as to produce a spectrum of intensity versus wavelength which is a superposition of the spectra obtained from each dopant species separately introduced into the host lattice.

It will be appreciated that sputtering has been disclosed herein as the best mode for producing the phosphor films. During sputtering, the composition of the sputtered film will deviate from the composition of the source material forming the sputtering target. This occurs due to a difference in sticking coefficients between the different elements being sputtered; a difference in the sputtering yields between the elements of the target; and incorporation of chemical elements (such as nitrogen) in the sputtering gas into the thin film that are not initially present in the sputtering target. It will be understood however that these deviations are limited in magnitude such that the grown films do crystallize in those crystal structures, when annealed appropriately, expected from the target composition.

It will be appreciated by those skilled in the art that while the fabrication of the new electroluminescent phosphors disclosed herein has been described using sputtering as the film preparation method, other methods known to those in the art may be used. Other methods of fabrication include electron beam deposition, laser ablation, chemical vapour deposition, vacuum evaporation, molecular beam epitaxy, sol gel deposition and plasma enhanced vacuum evaporation to mention a few.

Various thin film dielectrics used in electroluminescent applications include $SiO_2$, SiON, $Al_2O_3$, $BaTiO_3$, $BaTa_2O_6$, $SrTiO_3$, $PbTiO_3$, $PbNb_2O_6$, $Sm_2O_3$, $Ta_2O_5$, $TiO_2$, $Y_2O_3$, $Si_3N_4$, SiAlON. These may be used as substrates in the present invention by depositing onto glass, silicon or quartz substrates, to mention just a few.

Thick film on ceramic substrates may also be used. While many of the results dislcosed herein were obtained using $BaTiO_3$ thick film dielectrics, other thick films on ceramic substrates may also be used. The ceramic substrate may be alumina ($Al_2O_3$) or the same ceramic as the thick film itself. Thick dielectric films of $BaTiO_3$, $SrTiO_3$, $PbZrO_3$, $PbTiO_3$, to mention just a few, may also be used.

Variations of the EL laminate device configuration will be readily apparent to those skilled in the art. An alumina substrate may be used onto which the lower conductive electrode is deposited followed by the high dielectric constant material, the phosphor and then the outer transparent electrode. Alternatively, a conductive electrode contact may be deposited onto the back of a thick, rigid dielectric substrate material onto the front of which the phosphor layer is deposited followed by the outer conductive electrode.

TABLE 1

TYPICAL PHOSPHOR COMPOSITIONS AND FIRING CONDITIONS FOR PREPARATION OF DOPED GALLATES

| CaO (g) | BaCO$_3$ (g) | SrCO$_3$ (g) | Ga$_2$O$_3$ (g) | Tb$_4$O$_7$ (g) | Eu$_2$O$_3$ (g) | Firing conditions | Compound formed |
|---|---|---|---|---|---|---|---|
| — | — | 4.163 | 5.563 | 0.222 | 0.052 | 1100° C./24 hr | Sr$_{0.96}$Tb$_{0.04}$Eu$_{0.01}$Ga$_2$O$_4$ |
| — | — | 4.308 | 5.581 | 0.111 | — | 1100° C./24 hr | Sr$_{0.98}$Tb$_{0.02}$Ga$_2$O$_4$ |
| — | — | 4.358 | 5.589 | — | 0.053 | 1100° C./24 hr | Sr$_{0.99}$Eu$_{0.01}$Ga$_2$O$_4$ |
| 2.164 | — | — | 7.535 | 0.301 | — | 1100° C./2 hr | Ca$_{0.96}$Tb$_{0.04}$Ga$_2$O$_4$ |
| 2.269 | — | — | 7.659 | — | 0.072 | 1100° C./2 hr | Ca$_{0.99}$Eu$_{0.01}$Ga$_2$O$_4$ |
| — | 5.080 | — | 4.874 | — | 0.046 | 1200° C./12 hr | Ba$_{0.99}$Eu$_{0.01}$Ga$_2$O$_4$ |
| — | 5.029 | — | 4.874 | — | 0.097 | 1200° C./24 hr | Ba$_{0.96}$Tb$_{0.02}$Ga$_2$O$_4$ |
| 4.544 | — | — | 5.165 | — | 0.291 | 1000° C./12 hr | Ca$_{2.94}$Eu$_{0.06}$Ga$_2$O$_6$ |

Therefore what is claimed is:

1. A phosphor having the formula CaGa$_2$O$_4$:n%RE wherein RE is a rare earth dopant selected from the group consisting of Eu, Tb, Pr and combinations thereof, n % is the mole percent of RE present in CaGa$_2$O$_4$, and spans the range in which said rare earths are soluble in CaGa$_2$O$_4$, said phosphor characterized by electroluminescence when an effective voltage is applied across said phosphor.

2. A phosphor having the formula Ca$_3$Ga$_2$O$_6$:n%RE wherein RE is a rare earth dopant selected from the group consisting of Eu and Tb and combinations thereof, n % is the mole percent of RE present in Ca$_3$Ga$_2$O$_6$, and spans the range in which said rare earths are soluble in Ca$_3$Ga$_2$O$_6$, said phosphor characterized by electroluminescence when an effective voltage is applied across said phosphor.

3. A phosphor having the formula CaGa$_4$O$_7$:n%RE wherein RE is a rare earth dopant selected from the group consisting of Eu, Dy, Tb and combinations thereof, n % is the mole percent of RE present in CaGa$_4$O$_7$, and spans the range in which said rare earths are soluble in CaGa$_4$O$_7$, said phosphor characterized by electroluminescence when an effective voltage is applied across said phosphor.

4. A phosphor having the formula Sr$_3$Ga$_4$O$_9$:n%Tb, wherein n % is the mole percent of Tb and spans the range in which Tb is soluble in Sr$_3$Ga$_4$O$_9$, said phosphor characterized by electroluminescence when an effective voltage is applied across said phosphor.

5. A compound having a formula Ga$_2$O$_3$:n$_1$%Eu,n$_2$%Cd, wherein n$_1$ % is the mole percent amount of Eu present in Ga$_2$O$_3$ and spans the range in which Eu is soluble in Ga$_2$O$_3$, and n$_2$ % is the mole percent amount of Cd present in Ga$_2$O$_3$ and spans the range in which Cd is soluble in Ga$_2$O$_3$ but not exceeding 14.3%.

6. A compound having a formula SrGa$_2$O$_4$:n%RE, wherein RE is a rare earth selected from the group consisting of Tb and a combination of Tb and Eu, and wherein n % is the mole percent of RE present in SrGa$_2$O$_4$ and spans the range in which said rare earths are soluble in SrGa$_2$O$_4$.

7. A compound having a formula BaGa$_2$O$_4$:n%RE, wherein RE is a rare earth selected from the group consisting of Tb and a combination of Tb and Eu, and wherein n % is the mole percent of RE present in BaGa$_2$O$_4$ and spans the range in which said rare earths are soluble in BaGa$_2$O$_4$.

8. A compound having a formula Ca$_3$Ga$_2$O$_6$:n%RE, wherein RE is a rare earth selected from the group consisting of Eu and Tb and combinations thereof, wherein n % is the mole percent of RE present in Ca$_3$Ga$_2$O$_6$, and spans the range in which said rare earths are soluble in Ca$_3$Ga$_2$O$_6$.

9. A compound having a formula CaGa$_4$O$_7$:n%RE, wherein RE is a rare earth selected from the group consisting of Eu, Dy, Tb and combinations thereof, wherein n % is the mole percent of RE present in CaGa$_4$O$_7$, and spans the range in which said rare earths are soluble in CaGa$_4$O$_7$.

10. A compound having a formula SrGa$_4$O$_9$:n%Tb, wherein n % is the mole percent of Tb in SrGa$_4$O$_9$, and spans the range in which Tb is soluble in SrGa$_4$O$_9$.

11. A compound having a formula CaGa$_2$O$_4$:n%RE, wherein RE is a rare earth selected from the group consisting of Eu, Tb, Pr and combinations thereof, wherein n % is the mole percent of RE present in CaGa$_2$O$_4$, and spans the range in which said rare earths are soluble in CaGa$_2$O$_4$.

* * * * *

UNITED STATES PATENT AND TRADEMARK OFFICE
CERTIFICATE OF CORRECTION

PATENT NO.  : 5,725,801
DATED       : March 10, 1998
INVENTOR(S) : Adrian H. Kitai, Tian Xiao and Guo Liu It is certified that error appears in the above-identified patent and that said Letters Patent is hereby corrected as shown below:

On the title page of the Letters Patent under RELATED U.S. APPLICATION DATA, the information should read as follows:

--Provisional application No. 60/000,781 filed July 5, 1995.--

Signed and Sealed this

Nineteenth Day of May, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,725,801
DATED : March 10, 1998
INVENTOR(S) : Adrian H. Kitai, Guo Liu, Tian Xiao It is certified that error appears in the above-identified patent and that said Letters Patent is hereby corrected as shown below:

TITLE PAGE:

In abstract, line 5, delete "$SrGa_4O_9$" should read --$Sr_3Ga_4O_9$--;

In "OTHER PUBLICATIONS" page 2, column 1, line 14, delete "$Zn_2SiO_4$" should read --$Zn_2SiO_4$--;

In "OTHER PUBLICATIONS" page 2, column 1, line 24, delete "$Zn_2SiO_4$" should read --$Zn_2SiO_4$--;

In "OTHER PUBLICATIONS" page 2, column 2, line 2, delete "$Ga_2)_3*$" should read --$Ga_2O_3$--;

In "OTHER PUBLICATIONS" page 2, column 2, line 8, delete "inorg. nucl." should read --Inorg. Nucl.--;

In "OTHER PUBLICATIONS" page 2, column 2, line 19, delete "Ieland" should read --Ireland--;

Column 16, claim 10, delete "$SrGa_4O_9$" at each occurrence, should read --$Sr_3Ga_4O_9$--;

UNITED STATES PATENT AND TRADEMARK OFFICE
CERTIFICATE OF CORRECTION

PATENT NO. : 5,725,801
DATED : March 10, 1998
INVENTOR(S) : Adrian H. Kitai, Guo Liu, Tian Xiao It is certified that error appears in the above-identified patent and that said Letters Patent is hereby corrected as shown below:

In column 2, line 61, delete "BATiO$_3$" should read --BaTiO$_3$--;

In column 4, line 12, delete "raffler" should read --rather--;

In column 4, line 44, delete "Fu" should read --Eu--;

In column 5, line 26, delete "CaGa$_4$O$_2$" should read --CaGa$_4$O$_7$--;

In column 7, line 22, delete "Sr$_{2.68}$" should read --Sr$_{2.88}$--;

In column 7, line 34, delete "Ca$_{2.94}$Eu$_{0.06}$Ga$_2$O$_8$" should read --Ca$_{2.94}$Eu$_{0.06}$Ga$_2$O$_6$--;

In column 7, line 61, delete "Sr$_{0.96}$Tb$_{0.002}$Ga$_2$O$_4$" should read --Sr$_{0.98}$Tb$_{0.02}$Ga$_2$O$_4$--;

In column 11, line 14, delete "Ca$_{0.96}$Tb$_{0.01}$Eu$_{0.01}$Ga$_2$O$_4$" should read --Ca$_{0.98}$Tb$_{0.01}$Eu$_{0.01}$Ga$_2$O$_4$--;

In column 11, at the end of line 32, delete "438 nm ($^5D_3 \rightarrow {}^F_4$" should read --438 nm $^5D_3 \rightarrow {}^7F_4$--;

In column 11, line 51, delete "Ba$_{0.96}$Tb$_{0.02}$Ga$_2$O$_4$" should read --Ba$_{0.98}$Tb$_{0.02}$Ga$_2$O$_4$--;

UNITED STATES PATENT AND TRADEMARK OFFICE
CERTIFICATE OF CORRECTION

PATENT NO. : 5,725,801
DATED : March 10, 1998
INVENTOR(S) : Adrian H. Kitai, Guo Liu, Tian Xiao It is certified that error appears in the above-identified patent and that said Letters Patent is hereby corrected as shown below:

Table 1, first line under "Compound formed" column, delete "$Sr_{0.96}Tb_{0.04}Eu_{0.01}Ga_2O_4$" should read --$Sr_{0.95}Tb_{0.04}Eu_{0.01}Ga_2O_4$--;

Table 1, seventh line under "Compound formed" column, delete "$Ba_{0.96}Tb_{0.02}Ga_2O_4$" should read --$Ba_{0.98}Tb_{0.02}Ga_2O_4$--;

"OTHER PUBLICATIONS" (page 2 of the printed patent)

In column 2, line 13, delete "Syvania" should read --Sylvania--;

Signed and Sealed this

Sixteenth Day of March, 1999

Attest:

Attesting Officer

Q. TODD DICKINSON

Acting Commissioner of Patents and Trademarks